United States Patent
Scheele et al.

(10) Patent No.: US 8,634,164 B1
(45) Date of Patent: Jan. 21, 2014

(54) METHOD AND APPARATUS FOR DETACHING A HEAD SUSPENSION COMPONENT FROM A SEMI-FINISHED SUSPENSION PRODUCT

(75) Inventors: Bryan J. Scheele, Hutchinson, MN (US); Richard A. Schnitzler, Dassel, MN (US); Brett L. Haugen, Hutchinson, MN (US); Ronald W. Rome, Annandale, MN (US); Lance J. Evans, Hutchinson, MN (US); Gregory S. Nelson, Stewart, MN (US); Michael R. Jensen, St. Michael, MN (US); Patrick R. LaLonde, Waite Park, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 2071 days.

(21) Appl. No.: 10/700,354

(22) Filed: Nov. 3, 2003

(51) Int. Cl.
*G11B 15/10* (2006.01)
*G11B 5/127* (2006.01)

(52) U.S. Cl.
USPC ........................................ 360/137; 29/603.01

(58) Field of Classification Search
None
See application file for complete search history.

(56) References Cited

U.S. PATENT DOCUMENTS

| | | | |
|---|---|---|---|
| 4,413,404 A | 11/1983 | Burns | |
| 4,434,638 A | 3/1984 | Sivachenko | |
| 4,520,930 A | 6/1985 | Lisiecki | |
| 5,041,317 A | 8/1991 | Greyvenstein | |
| 5,640,763 A | 6/1997 | Lindberg | |
| 6,466,412 B1 * | 10/2002 | Adams et al. | 360/245.2 |
| 6,657,821 B1 * | 12/2003 | Jenneke | 360/245.2 |

FOREIGN PATENT DOCUMENTS

JP     2000-57723     2/2000

* cited by examiner

*Primary Examiner* — David D Davis
(74) *Attorney, Agent, or Firm* — Faegre Baker Daniels LLP

(57) ABSTRACT

A method of detaching a head suspension component from a locating and transport structure where the head suspension component is integrally connected to the locating and transport structure by a tab having a reduced tensile strength with respect to each of the head suspension component and the locating and transport structure. The method includes applying a tensile load to the tab to cause the tab to fracture, so that the head suspension component is detached from the locating and transport structure.

31 Claims, 28 Drawing Sheets

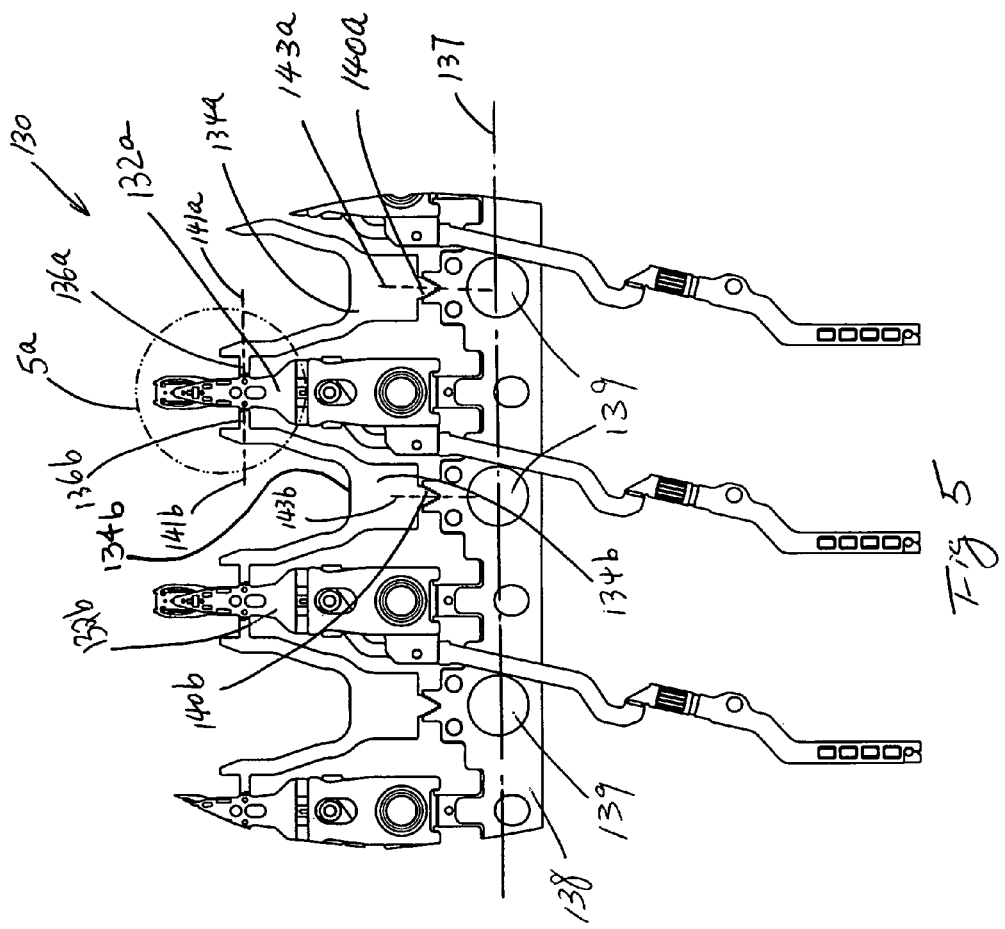

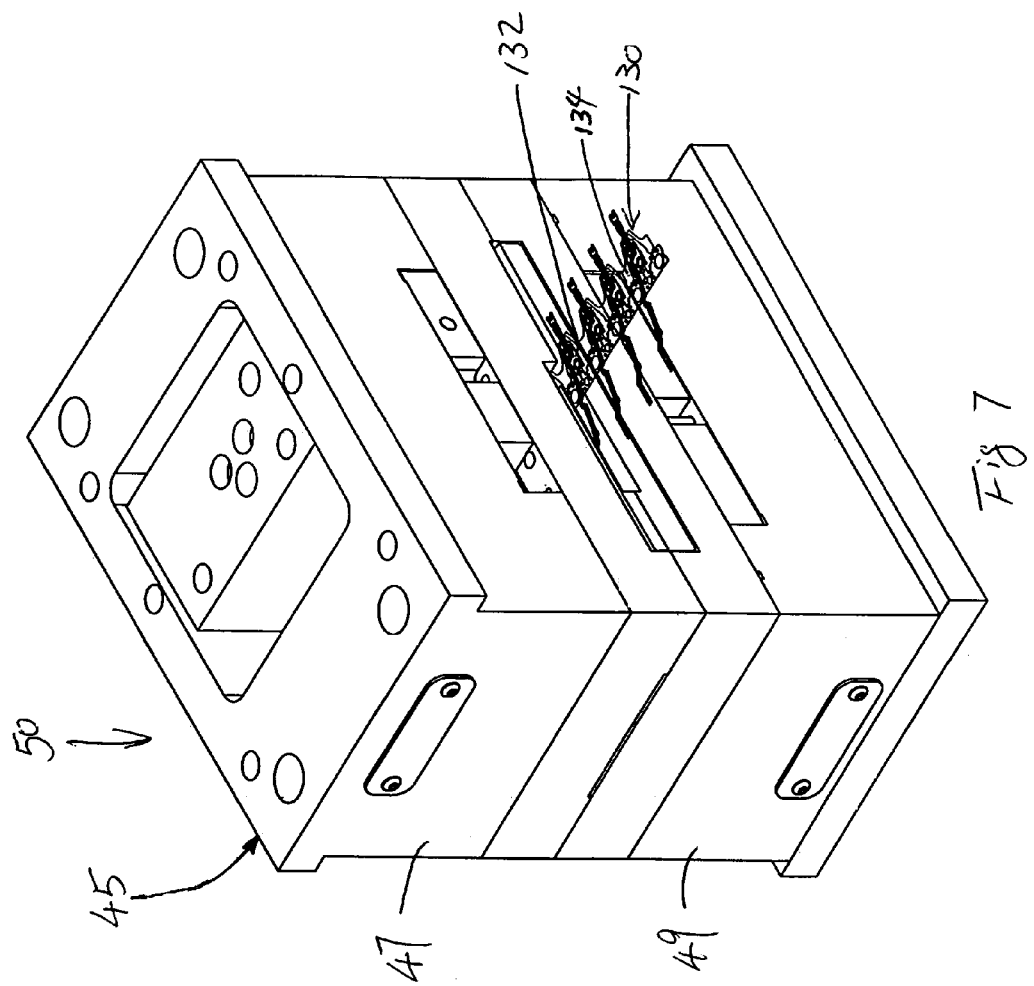

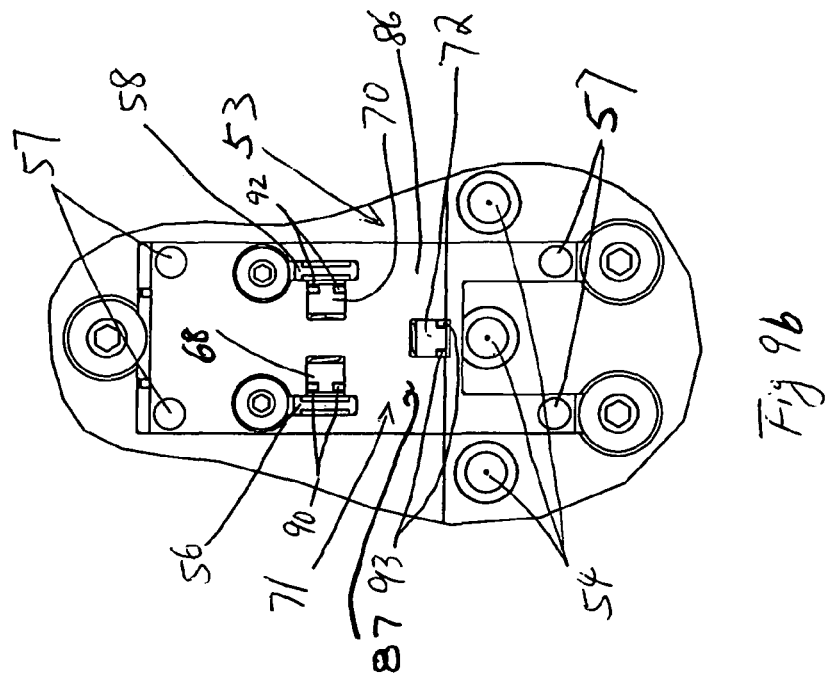
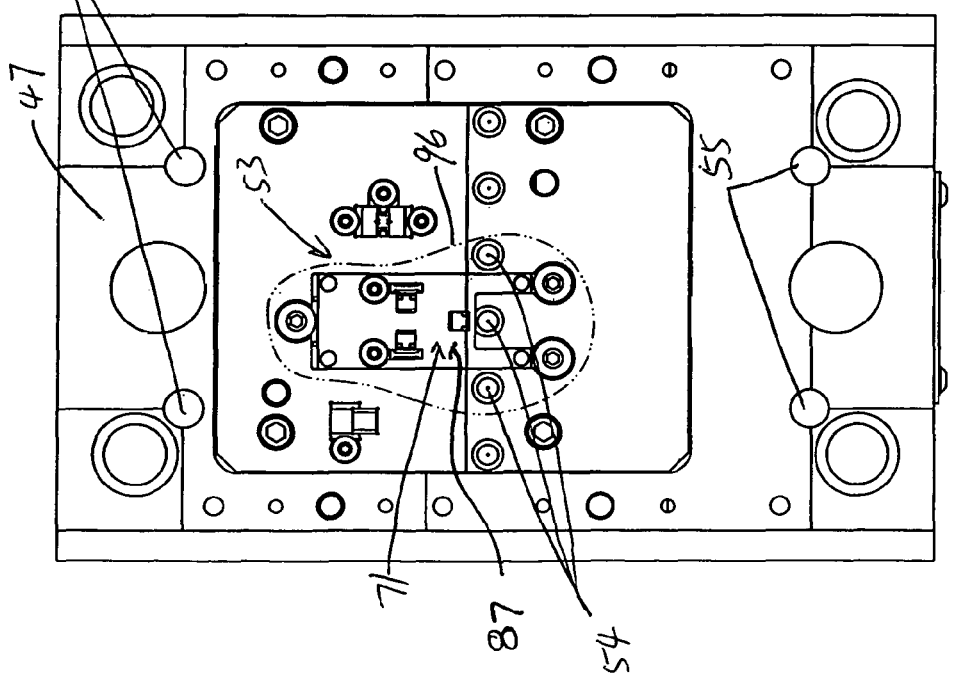

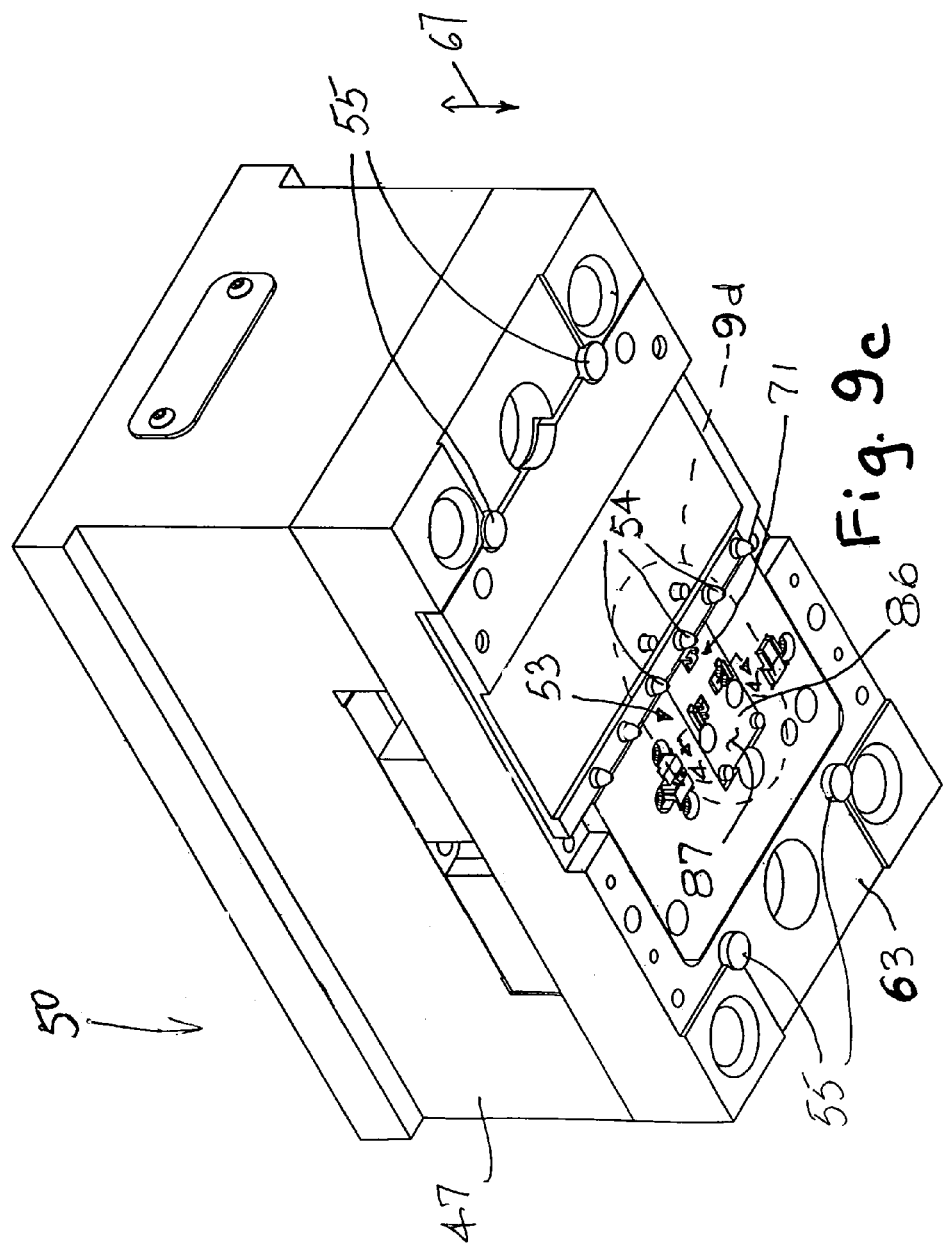

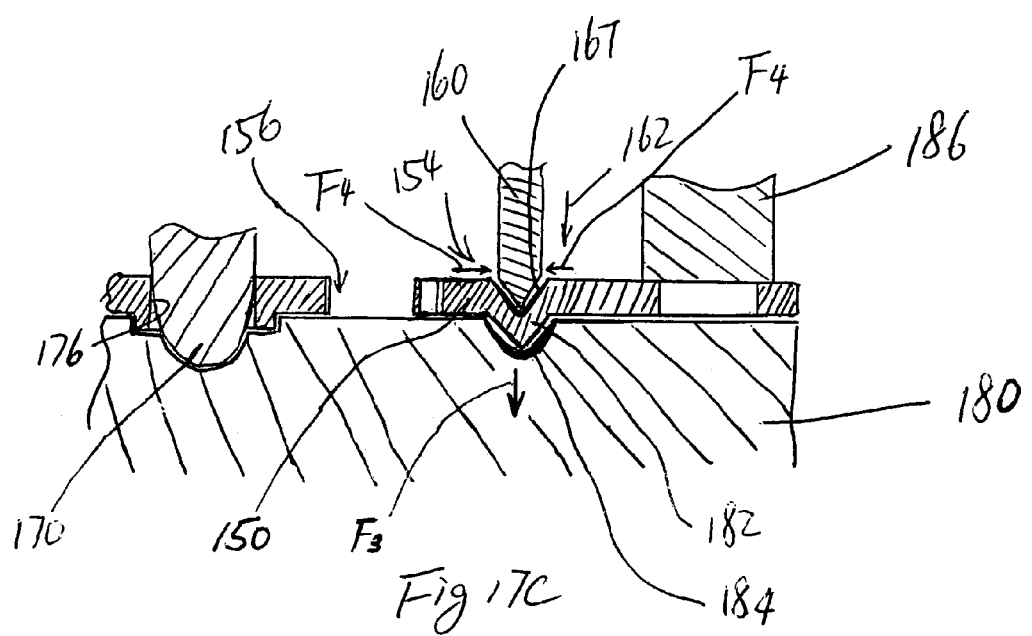

METHOD AND APPARATUS FOR DETACHING A HEAD SUSPENSION COMPONENT FROM A SEMI-FINISHED SUSPENSION PRODUCT

FIELD OF INVENTION

The present invention relates to the field of manufacturing head suspension components for disk drives and the like. More particularly, the present invention relates to a method and apparatus for separating such components from a locating and transport structure in which a plurality of such components are initially carried.

BACKGROUND OF THE INVENTION

Head suspension components are conventionally manufactured from a semi-finished suspension product. As used herein, the phrase "semi-finished suspension product" refers to a semi-finished product including at least one metal head suspension component integrally connected to a locating and transport structure, which generally includes a carrier strip, or a carrier strip with at least one intermediate member (e.g., a strut) securing the head suspension components to the carrier strip. As used herein, the phrase "locating and transport structure" refers to a feature or a configuration of the semi-finished suspension product that is used to ensure that the semi-finished suspension product is located at a desired position of an apparatus (e.g., a die) for detaching a head suspension component from the semi-finished suspension product and to ensure that the semi-finished suspension product is advanced through the apparatus in a stepwise manner.

During initial processing, the locating and transport structure provides a convenient way to handle the components while at the same time permitting access to the individual components for processing and testing. One way each individual component is attached to the locating and transport structure is by one or more tabs. As used herein, the term "tab" refers to a connecting member that integrally connects the head suspension component and the locating and transport structure together. In the practice of the present invention, it has been found desirable to intentionally weaken a detaching portion of the tab. At some point in the manufacturing process, it is necessary to separate each individual component from the locating and transport structure, since the carrier strip and/or the intermediate member would interfere with installation of the individual component in its intended environment (such as mounting on an actuator arm in a disk drive assembly).

When the component is separated from the locating and transport structure, it is important to avoid mechanically altering the component, since the component typically has been manufactured to precise tolerances for its shape, operating characteristics, and configuration, which, when installed, will result in a desired set of parameters such as offset height, static attitude, gram load, and z-height. Separating the component from the locating and transport structure must be done in such a way as to avoid affecting these parameters. Additionally, it is preferable that the process of separating the component from the semi-finished suspension product be performed in a way that does not generate loose particles that would contaminate the installation environment.

FIG. 1 is a plan view of a prior art semi-finished suspension product 20 having a plurality of metal head suspension components 22, each integrally connected to a locating and transport structure 23 by tabs 26. The locating and transport structure 23 in this embodiment includes a carrier strip 24.

Traditionally, the head suspension components 22 are detached from the locating and transport structure 23 by applying shearing forces to the tabs 26 through use of a pair of shear bars (not shown). The shearing process can create many metal particles on the sheared edge of the head suspension component. An ultrasonic cleaning process that has been used to remove other particles is not effective at removing the metal particles on the sheared edge.

FIG. 2 shows a schematic view of sheared edges 28 of the tab 26. FIGS. 3a and 3b are two different microphotographs of sheared edges showing metal particles resulting from the shearing process. The metal particles have the potential to cause disk drive failure during operation. Thus, there is a need for a method and apparatus that can effectively detach the head suspension components 22 from the locating and transport structure 23 without generating metal particles.

BRIEF DESCRIPTION OF THE DRAWINGS

FIG. 5 shows an enlarged view of region 5 of FIG. 4.

FIG. 6b is a magnified view of the microphotograph of FIG. 6a.

FIG. 7 is a perspective view of an apparatus for detaching the head suspension components from the locating and transport structure of FIG. 4 in accordance with the present invention, where the semi-finished suspension product is placed between an upper portion and a lower portion of the apparatus.

FIG. 9a is a plan view of the upper portion of the apparatus of FIG. 7 looking up.

FIG. 9b is an enlarged view of region 9b of FIG. 9a showing an upper portion of the workstation in the upper portion of the apparatus of FIG. 7.

FIG. 9c is a perspective view of the upper portion of the apparatus of FIG. 7.

FIG. 14c is a view similar to FIG. 14b except that the engaging members are in second disengaged positions.

FIG. 17c is a cross-sectional view taken along line 17-17 of FIG. 16a with the punch advanced and the tab fractured.

DETAILED DESCRIPTION

Figure 4:
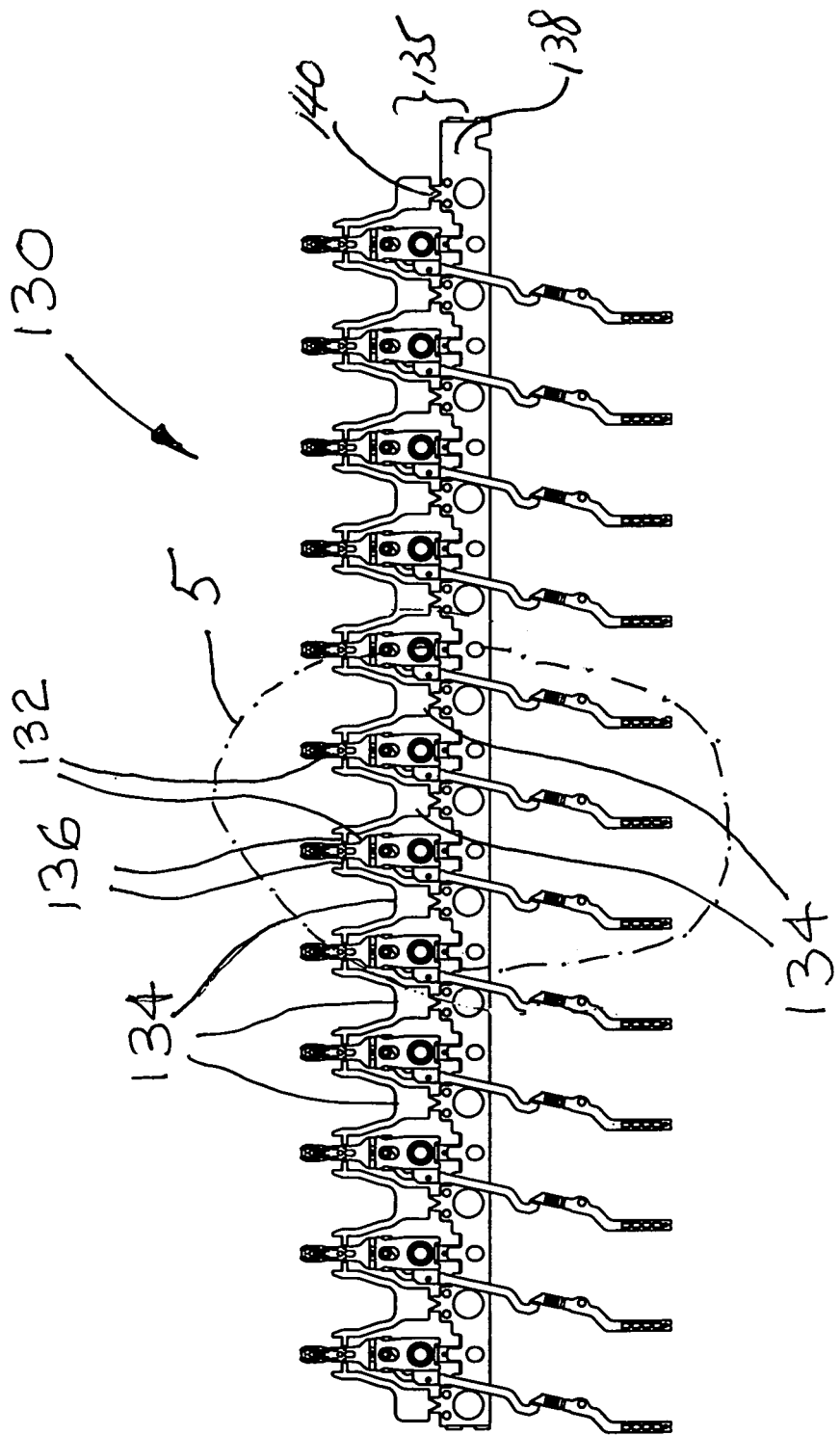
FIG. 4 is a plan view of an embodiment of a semi-finished suspension product having a plurality of metal head suspension components secured by a plurality of intermediate members to a carrier strip useful in the practice of the present invention.

FIG. 4 is a plan view of an embodiment of a semi-finished suspension product 130 having a plurality of metal head suspension components 132 integrally connected to a locating and transport structure 135. The locating and transport structure 135 in this embodiment includes a carrier strip 138 and a plurality of intermediate members 134 (e.g., a struts) securing the head suspension components 132 to the carrier strip 138. The intermediate members 134 are integrally connected to the carrier strip 138 by tabs 140, and to the head suspension components 132 by tabs 136 as well. In accordance with the present invention, tensile loads are applied to the tabs 136 and 140 by an apparatus (e.g. a die) to cause them to fracture, so that the intermediate members 134 are detached from the metal head suspension component 132 and the carrier strip 138. The details of an embodiment of the apparatus will be discussed below. In the illustrated embodiment, it is to be understood that after tabs 136 and 140 are fractured, the head suspension components 132 are still attached to carrier strip 138. The components 132 are thereafter detached from the carrier strip 138 in a subsequent process, which will be discussed in detail below.

FIG. 5 shows an enlarged view of region 5 of FIG. 4. The tabs 136a and 136b respectively include axes 141a and 141b. Preferably, the axes 141a and 141b are collinear and parallel to a longitudinal axis 137 of the carrier strip 138. The tabs 140a and 140b respectively include axes 143a and 143b. The axes 143a and 143b are generally parallel with each other. Preferably, the axes 143a and 143b are perpendicular to the longitudinal axis 137 of the carrier strip 138.

Figure 5A:
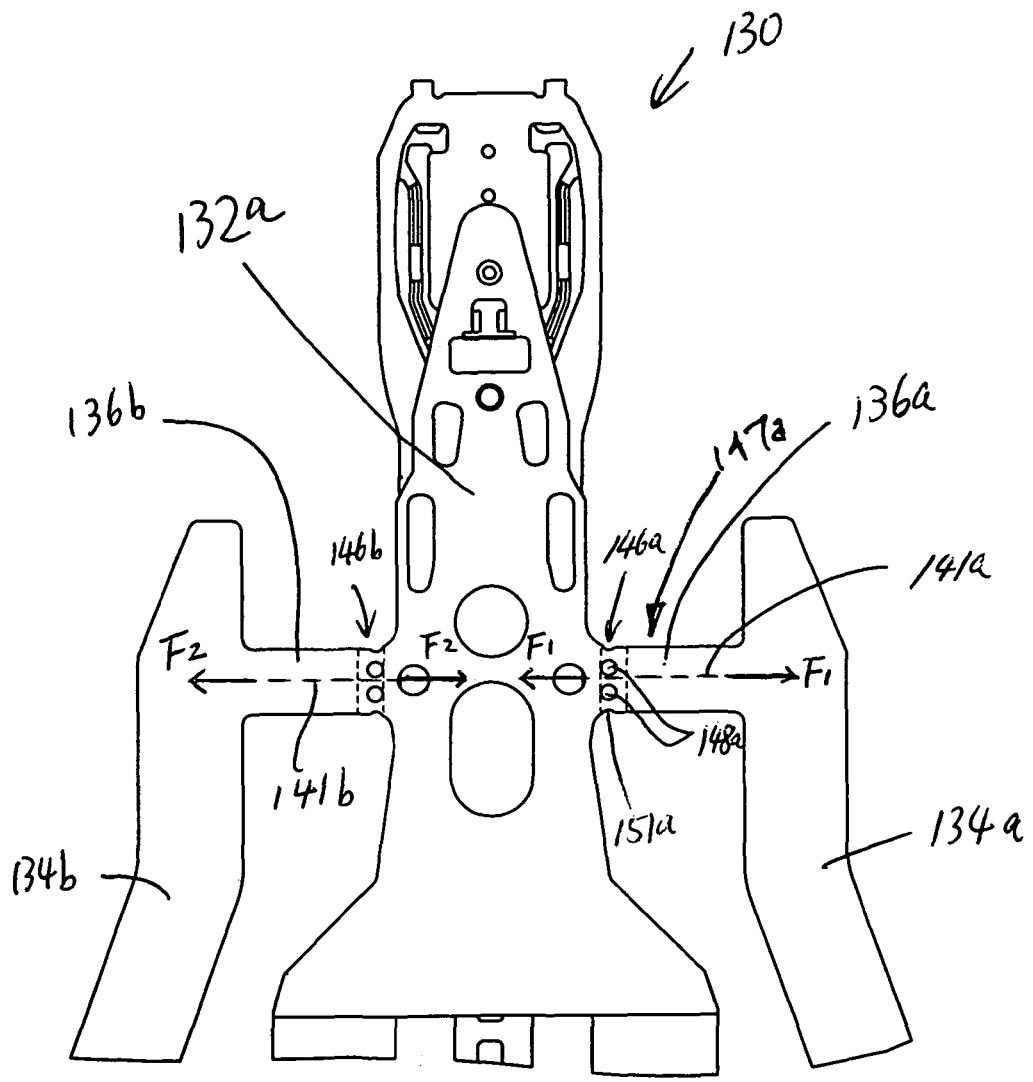
FIG. 5a shows an enlarged view of region 5a of FIG. 5.

FIG. 5a shows an enlarged view of region 5a of FIG. 5. The tabs 136a and 136b respectively include detaching regions 146a and 146b. In addition, as shown in FIG. 5, the tabs 140a and 140b that respectively connect the intermediate members 134a and 134b and the carrier strip 138 also include detaching regions similar to the detaching regions 146a and 146b. The features of the detaching region 146a will be described in detail below. Other detaching regions, including the detaching region 146b, may have similar features. The detaching region of the tab has a lower tensile strength than other regions of the tab.

In general, the detaching region 146a in the tab 136a is located adjacent to the head suspension component 132a. The detaching region 146a is generally a reduced cross sectional area of the tab 136a. As a result, the detaching area or region 146a has a lower tensile strength than other areas or regions 147a of the tab 136a. The reduced cross sectional area 146a can be created by either creating one or more apertures 148a extending through the tab 136a, or creating one or more notches 151a on at least one edge of the tab 136a. In addition, reduction of the thickness of the detaching region 146a can create a reduced cross sectional area in the tab 136a. This can be implemented through a partial etching process or a coining process. The processes of partial etching and creating apertures and notches are commonly known in the industry for other purposes.

It is to be understood that the reduced cross sectional area 146a can also be created by combining any two or more of the processes discussed above. It is also to be understood that the invention is described herein in connection with exemplary methods and processes of creating the region having a lower tensile strength than other regions of the tab, to create a detaching region having a lower tensile strength than the other regions in the tab 136a.

After the detaching regions 146a and 146b are created in the tabs 136, the semi-finished suspension product 130 is acted on by an apparatus (e.g., a die) that applies tensile loads to the tabs 136a and 136b to cause them to fracture. In the illustrated embodiment, a first tensile load $F_1$ is generally applied along the axis 141a of the tab 136a, while a second tensile load $F_2$ is generally applied along the axis 141b of the tab 136b.

Figure 6A:
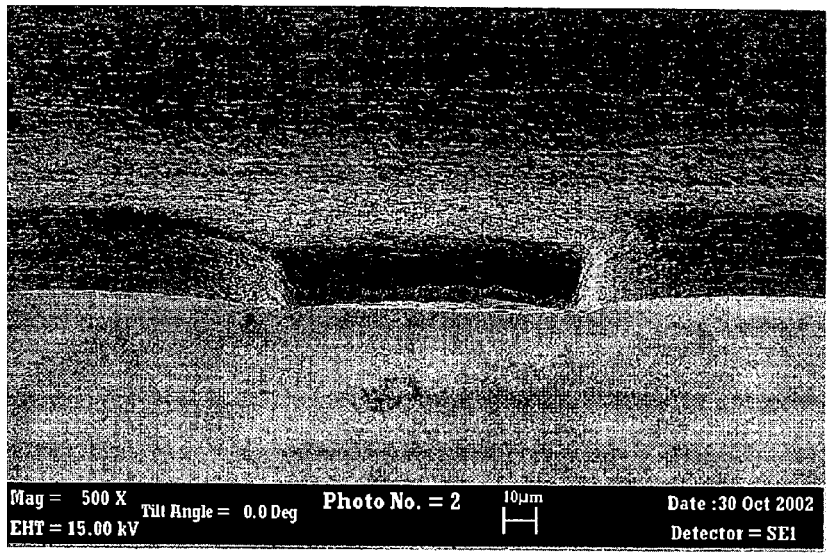
FIG. 6a is a microphotograph of a fractured edge showing that there are no metal particles resulting from a detaching process that applies a tensile load to a tab.
Figure 66:
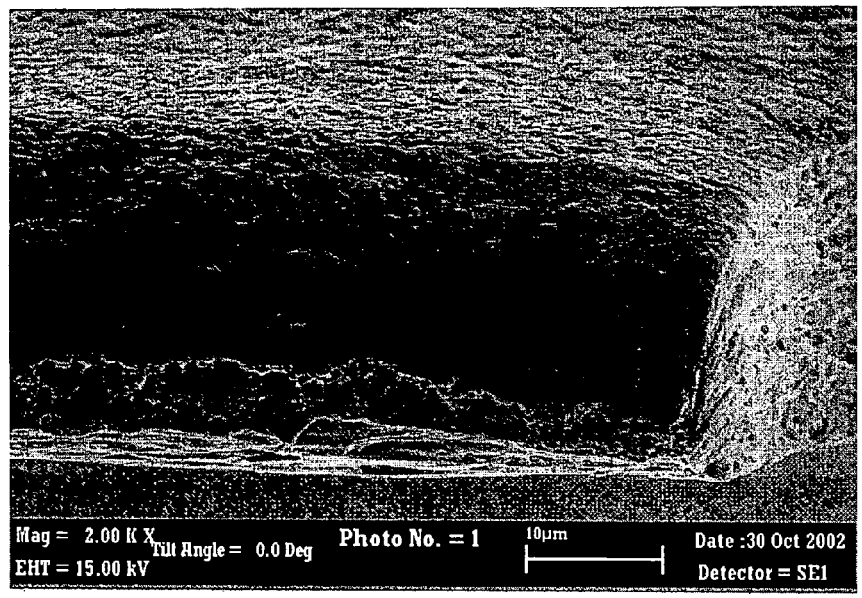

Experimental results demonstrate that the detaching process that applies the tensile loads $F_1$ and $F_2$ to respectively cause the tabs 136a and 136b to fracture does not liberate free metal particles. As a result, no metal particles are created on the fracture edges. FIG. 6a is a microphotograph of fractured edges showing that there are no metal particles resulting from a detaching process that applies a tensile load to a tab. FIG. 6b is a magnified view of the microphotograph of FIG. 6a.

Figure 1:
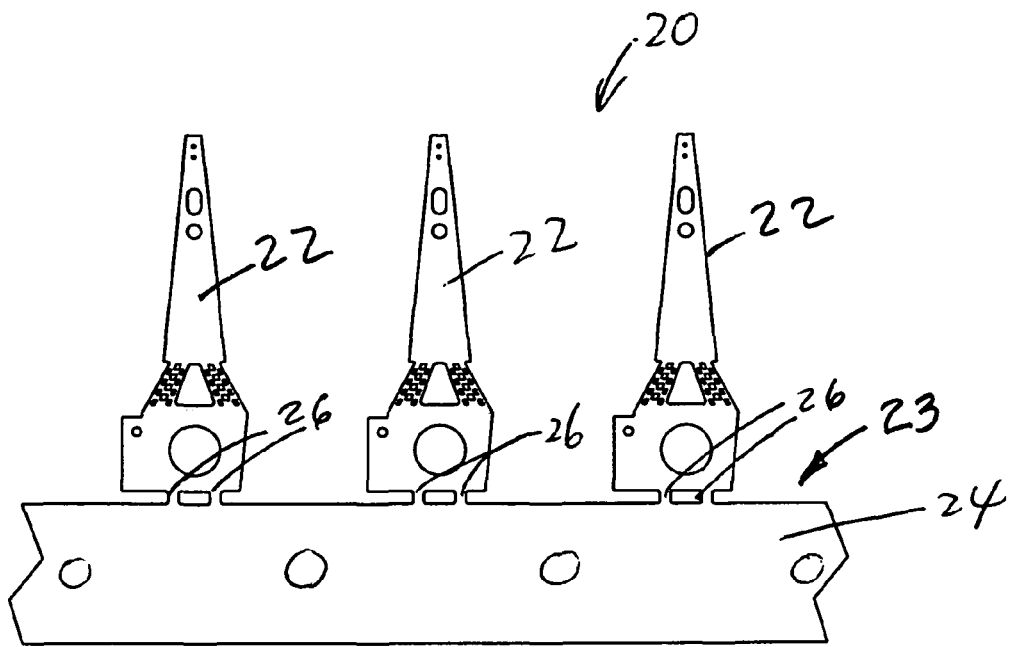
FIG. 1 is a plan view of a prior art semi-finished suspension product having a plurality of metal head suspension components integrally connected to a carrier strip by tabs.
Figure 2:
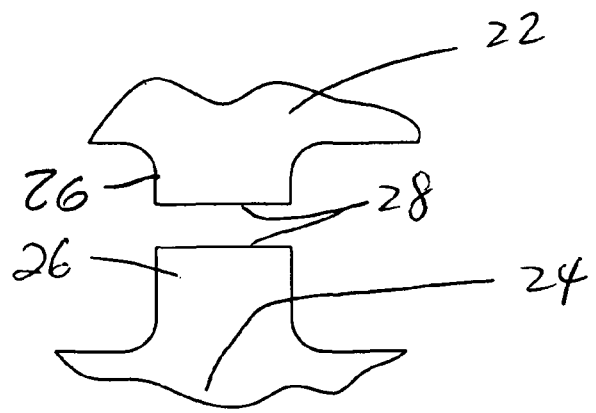
FIG. 2 is a schematic view of prior art sheared edges of the tab of the semi-finished suspension product of FIG. 1.
Figure 3A:
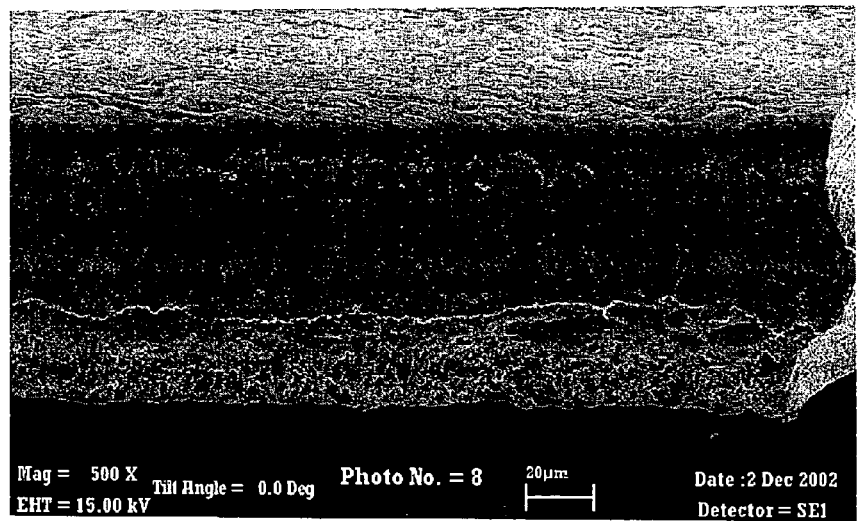
FIG. 3a is a microphotograph of a sheared edge showing metal particles resulting from a shearing process.
Figure 3B:
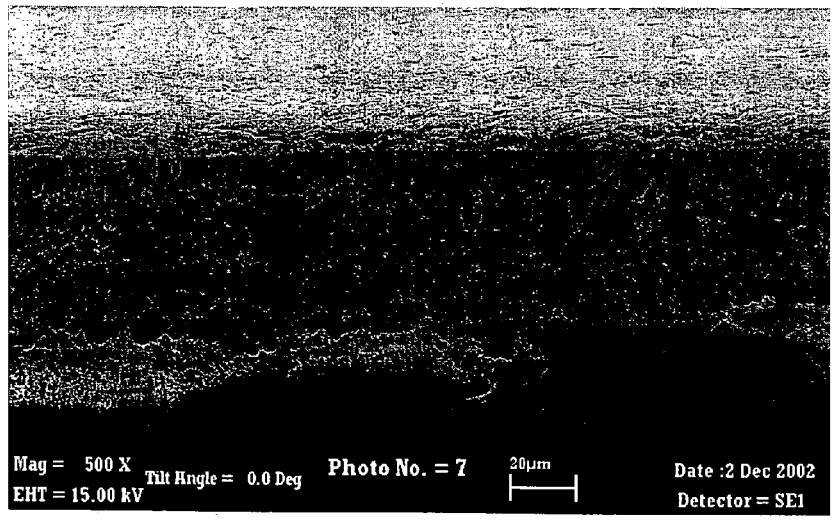
FIG. 3b is a slightly different microphotograph of a sheared edge showing metal particles resulting from a shearing process.

Although the method of applying tensile loads to the tabs for detaching the intermediate members is used with the exemplary semi-finished suspension product 130 as shown in FIG. 5, it is understood that such method can be used with any other kinds of semi-finished suspension products, including but not limited to the semi-finished suspension product 20 as shown in FIG. 1.

FIG. 7 is a perspective view of an apparatus 50 for detaching the intermediate members 134 from the semi-finished suspension product 130 in accordance with the present invention. In the illustrated embodiment, the apparatus 50 is a die 45 including an upper portion 47 and a lower portion 49. The semi-finished suspension product 130 is placed between the upper portion 47 and the lower portion 49 prior to the detaching process.

Figure 8B:
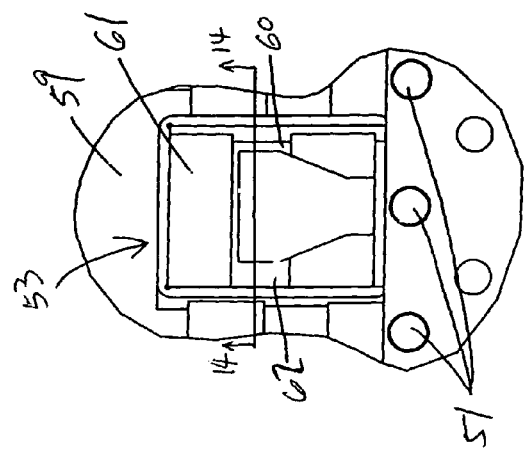
FIG. 8b is an enlarged view of region 8b of FIG. 8a showing a support member of a workstation in the lower portion of the apparatus of FIG. 7.
Figure 8A:
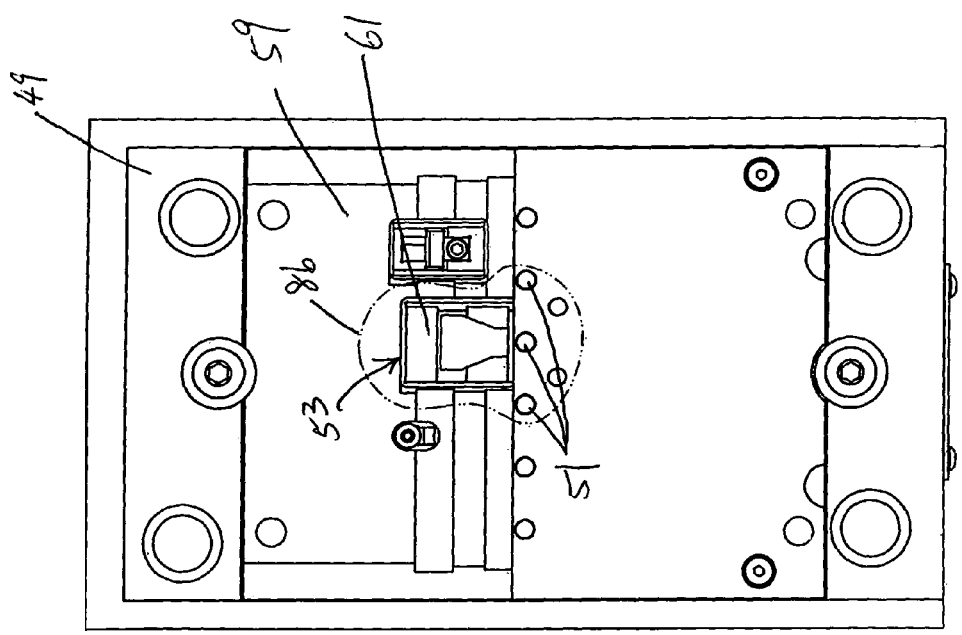
FIG. 8a is a plan view of the lower portion of the apparatus of FIG. 7 looking down.
Figure 8C:
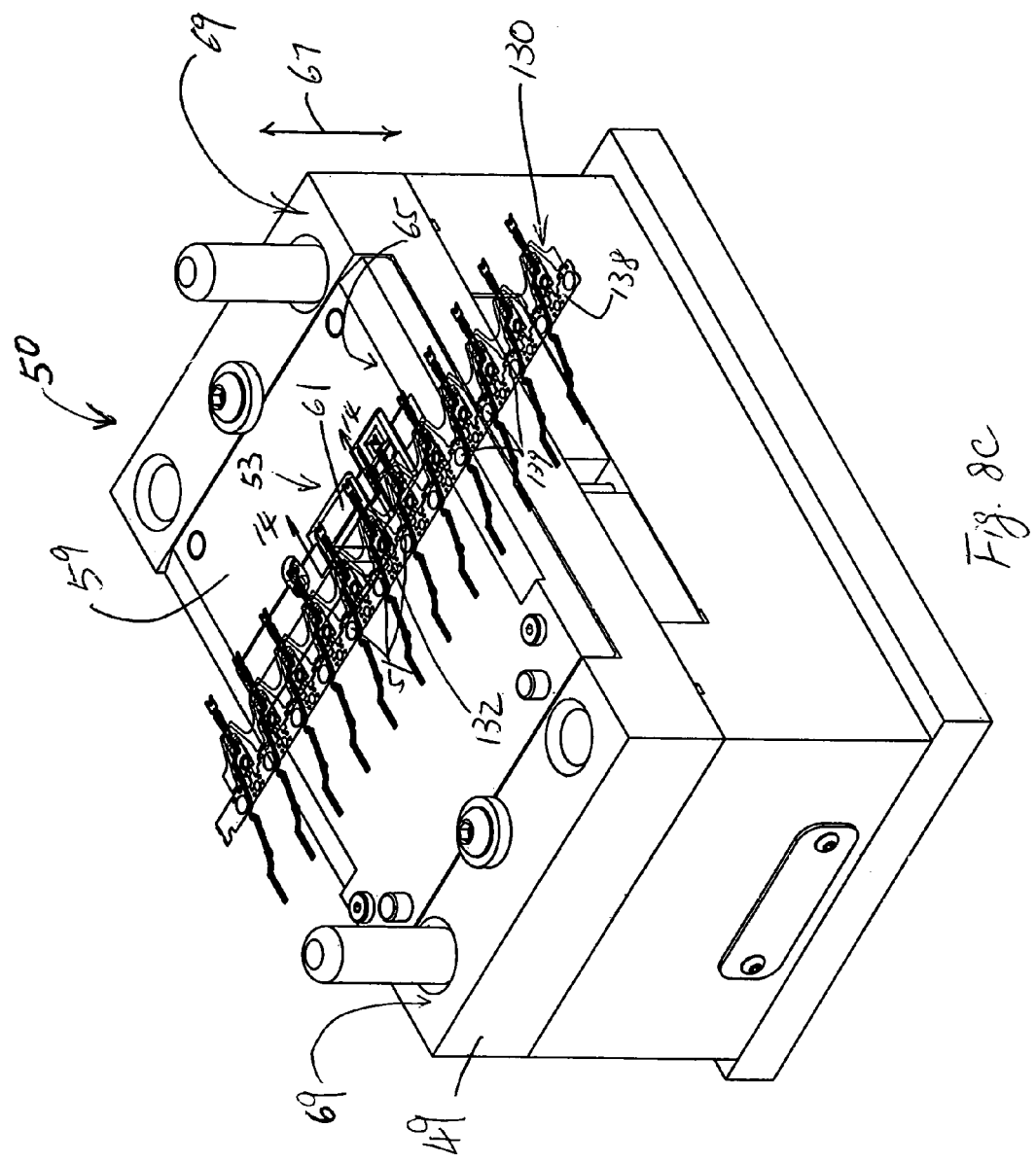
FIG. 8c is a perspective view of the lower portion of the apparatus of FIG. 7 with the semi-finished suspension product placed thereon.

Referring to FIG. 8a-8c, the lower portion 49 of the apparatus may be seen. A spring-loaded plate 59 is received in and movable with respect to the lower portion 49 along a direction 67 perpendicular to a top surface 69 of the lower portion 49. A support member 61 of a workstation 53 is received in the plate 59 and the lower portion 49 of the apparatus 50. The support member 61 is fixedly mounted to the lower portion 49 of the apparatus 50, but not the plate 59.

Figure 9D:
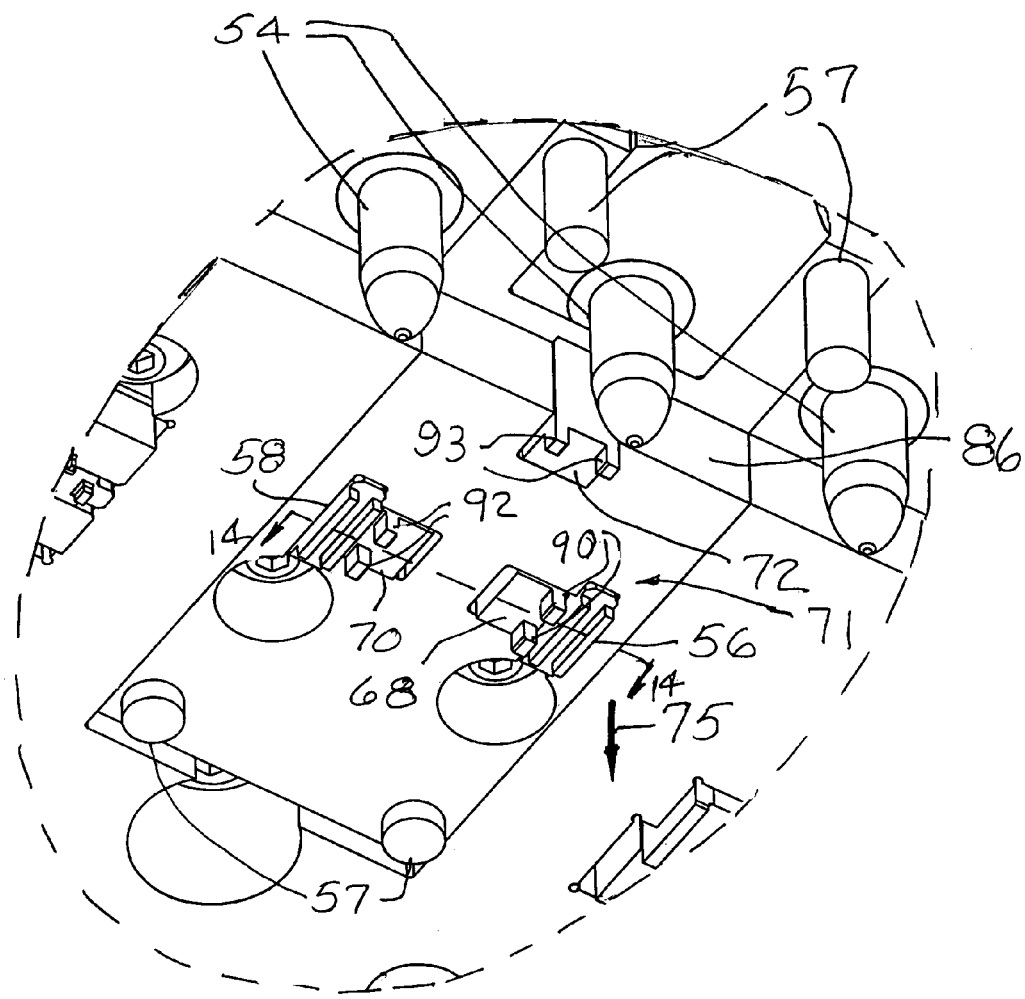
FIG. 9d is an enlarged view of region 9d of FIG. 9c.

Referring now to FIGS. 9a-9d, the upper portion 47 of the apparatus 50 may be seen. A plurality of spring-loaded locating pins 54, a plurality of spring-loaded pusher pins 55, and an upper portion 71 of the workstation 53 are received in and movable with respect to the upper portion 47 along the direction 67, which is perpendicular to a bottom surface 63 of the upper portion 47. Referring particularly to FIGS. 9b and 9d, the upper portion of the workstation 53 includes a spring-loaded hollow member 86, spring-loaded holding devices 56 and 58, and actuators 68, 70, and 72 with engaging members 90, 92, and 93. In the illustrated embodiment, the spring-loaded holding devices 56 and 58 are clamps. The clamps 56 and 58 are received in the hollow member 86 along the direction 67. The actuators 68, 70, and 72 are received in the hollow member 86. The hollow member 86 has a plurality of hard stops 57 fixedly attached on its bottom surface 87. These hard stops 57 are not movable with respect to the hollow member 86.

Referring to FIGS. 8c and 9c, prior to the detaching process, the semi-finished suspension product 130 is placed on the top surface 65 of the plate 59. The spring-loaded locating pins 54 of the upper portion 47 are received in corresponding holes 51 of the lower portion 49, passing through locating holes 139 of the carrier strip 138 to positively position the semi-finished suspension product 130 between the upper portion 47 and the lower portion 49. The carrier strip 138 of the semi-finished suspension product 130 is advanced through the workstation 53 in a stepwise manner. The process of advancing the carrier strip 138 is commonly known in the industry. As a result, the workstation 53 will act on each of the head suspension components 132 as the semi-finished suspension product 130 advances through the workstation 53.

Referring to FIGS. 10-13, the lower portion of the workstation 53 includes the support member 61 having support surfaces 60 and 62. The upper portion of the workstation 53 includes the hollow member 86, the clamps 56 and 58, the actuators 68, 70, and 72 with the engaging members 90, 92, and 93, rods 74, 76, and 78, spring members 82 and 83 (See FIGS. 12 and 13), cams 80 and 81, and clamp springs 64 and 66 (See FIGS. 10 and 12).

Figure 11:
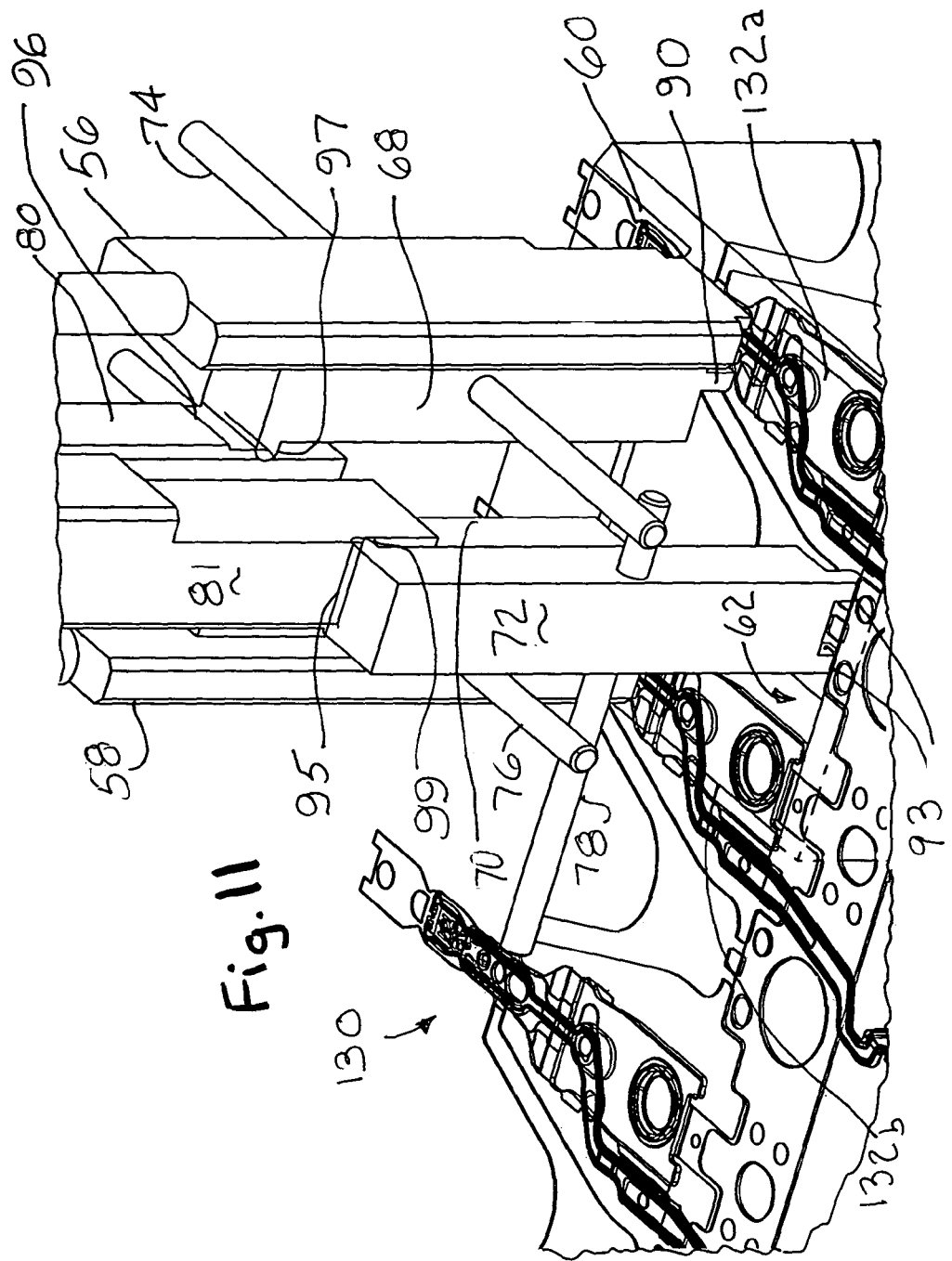
FIG. 11 is a perspective view of elements of the workstation of FIG. 10.

The first and second clamps 56 and 58 are respectively driven by the first and second clamp springs 64 and 66. Referring particularly to FIG. 11, the clamps 56 and 58 respectively clamp the first and second head suspension components 132b and 132a of the semi-finished suspension product 130 on the support surfaces 60 and 62 of the support member 61 through forces generated by the clamp springs 64 and 66. The clamping process will be discussed in detail below.

Figure 12:
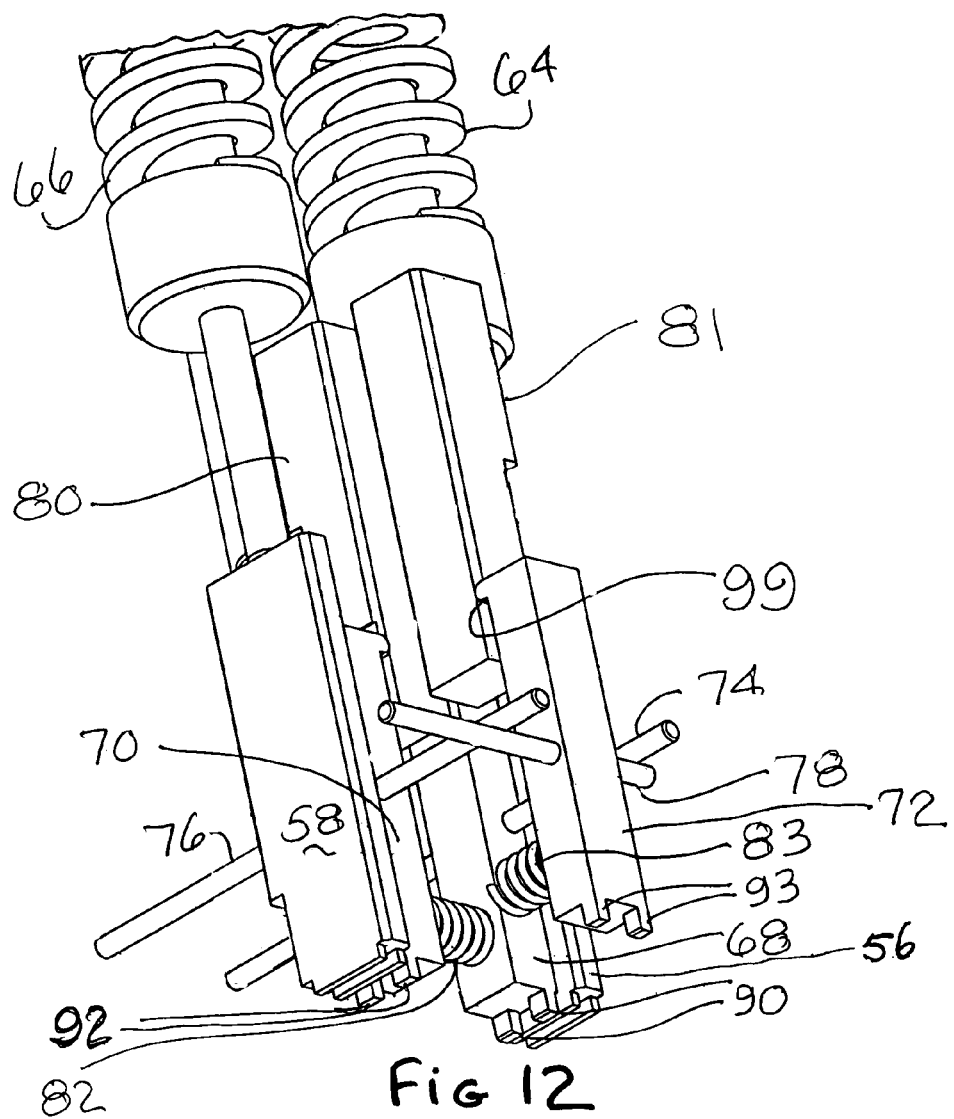
FIG. 12 is an another perspective view of the elements of the workstation of FIG. 10.
Figure 13:
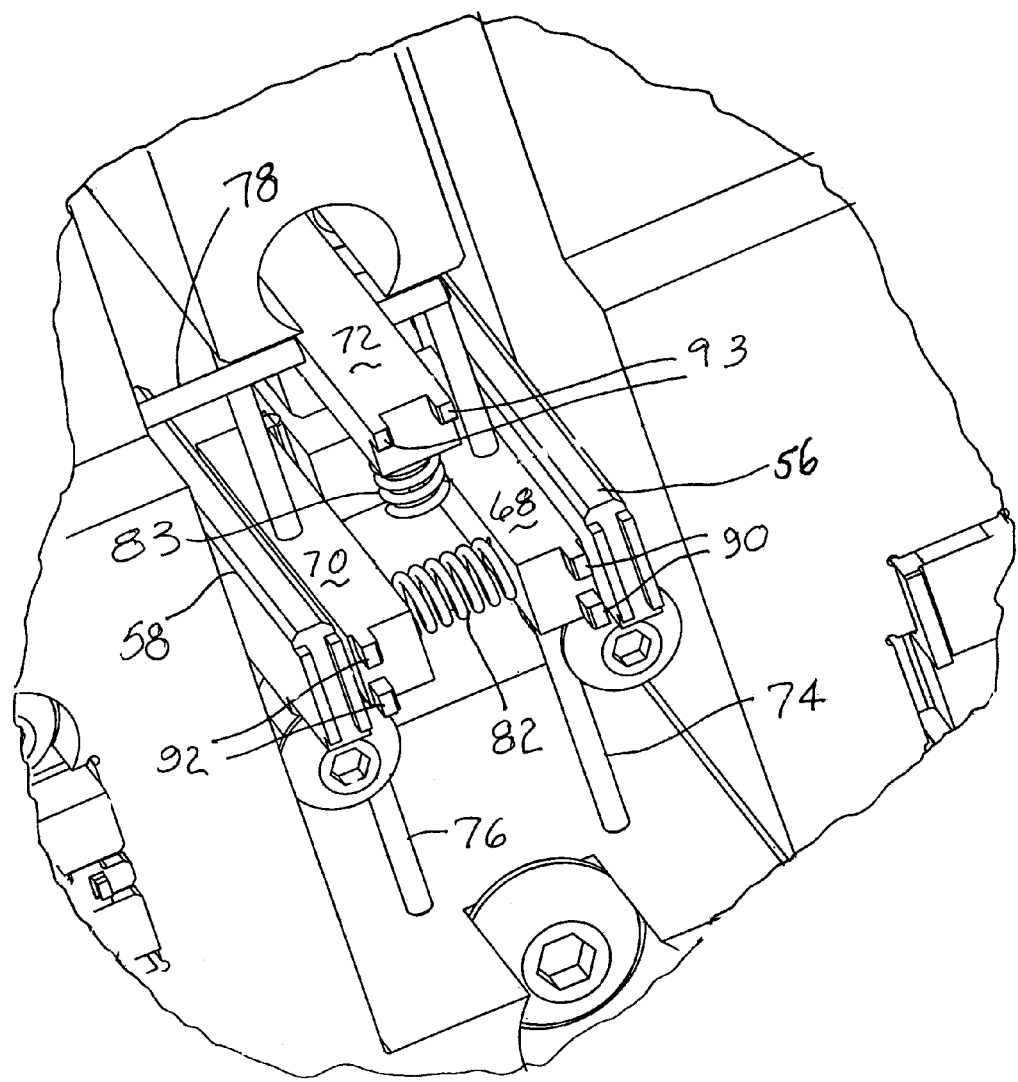
FIG. 13 is an another perspective view of the elements of the workstation of FIG. 10.

The actuators 68, 70, and 72 are pivotally attached to the rods 74, 76, and 78, respectively, so that each actuator can pivot about the rod to which the actuator is attached. The rods 74, 76, and 78 are positioned generally parallel to the support surfaces 60 and 62 of the support member 61. Referring particularly to FIGS. 12 and 13, the first spring member 82 is positioned between the first and second actuators 68 and 70. When the first and second actuators 68 and 70 respectively pivot about the first and second rods 74 and 76, the first spring member 82 is compressed. The second spring member 83 is positioned between the third actuator 72 and an inner portion (not shown) of the hollow member 86. When the third actuator 72 pivots about the third rod 78, the second spring member 83 is compressed.

Figure 10:
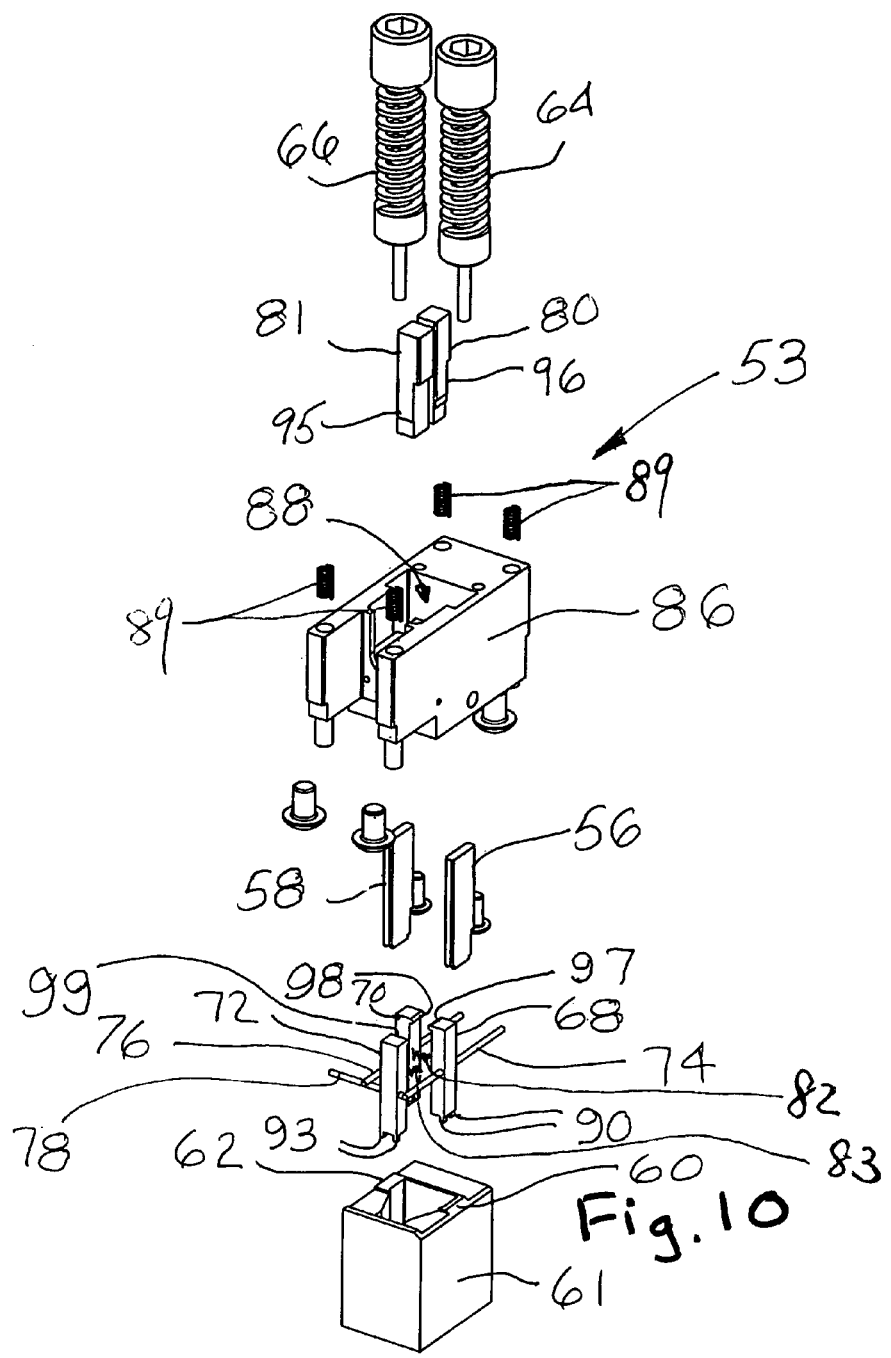
FIG. 10 is an exploded perspective view of the workstation of the apparatus of FIG. 7.

Referring particularly to FIG. 10, the hollow member 86 includes a hollow space 88 for receiving the clamps 56 and 58, the actuators 68, 70, and 72, the spring members 82 and 83, the rods 74, 76, and 78, and the cams 80 and 81. The rods 74, 76, and 78 are retained inside the hollow space 88, so that the actuators 68, 70, and 72 move upwardly and downwardly with the hollow member 86, and respectively pivot about the rods 74, 76, and 78 to compress the spring members 82 and 83 (See FIG. 13) as well. The clamps 56 and 58 can move independently of the movement of the hollow member 86.

The first and second cams 80 and 81 are positioned side by side in the hollow space 88 of the top member 86. The cams 80 and 81 are secured to the body of the upper portion 47 of the apparatus 50, but not to the hollow member 86 of the workstation 53. The cams 80 and 81 therefore move up and down with the upper portion 47 of the apparatus 50.

The first cam 80 includes two angled portions 96 (only one shown in FIGS. 10 and 11) on its side surface, while the second cam 81 includes one angled portion 95 on its side surface. The actuators 68, 70, and 72 each include a protruding portion 97, 98, and 99. When the angled portions 96 of the first cam 80 engage with the protruding portions 97 and 98 of the actuators 68 and 70, the actuators 68 and 70 respectively pivot about the rods 74 and 76. Similarly, when the angled portion 95 of the second cam 81 engages with the protruding portion 99 of the actuator 72, the actuator 72 pivots about the rod 78. The pivoting process will be discussed in detail below with reference to FIGS. 14a-14d.

Referring now to FIGS. 14a-14d, fragmentary cross sectional views of the elements of the workstation 53 taken along line 14-14 of FIGS. 8b, 8c, 9c, and 9d may be seen. There shown are the support member 61 with the support surfaces 60 and 62, the first and second actuators 68 and 70 with the engaging members 90 and 92, the first and second rods 74 and 76, the first and second clamps 56 and 58, the first cam 80, the first spring member 82, the spring-loaded pusher pin 55, and the hollow member 86. The semi-finished suspension product 130 is placed on the support surfaces 60 and 62 of the support member 61, located by the locating pins (not shown) received in the locating holes of the carrier strip. Although FIGS. 14a-14d illustrate the exemplary semi-finished suspension product 130 with two head suspension components 132a and 132b, it is understood that the semi-finished suspension product 130 can include any number of the head suspension components.

Figure 14A:
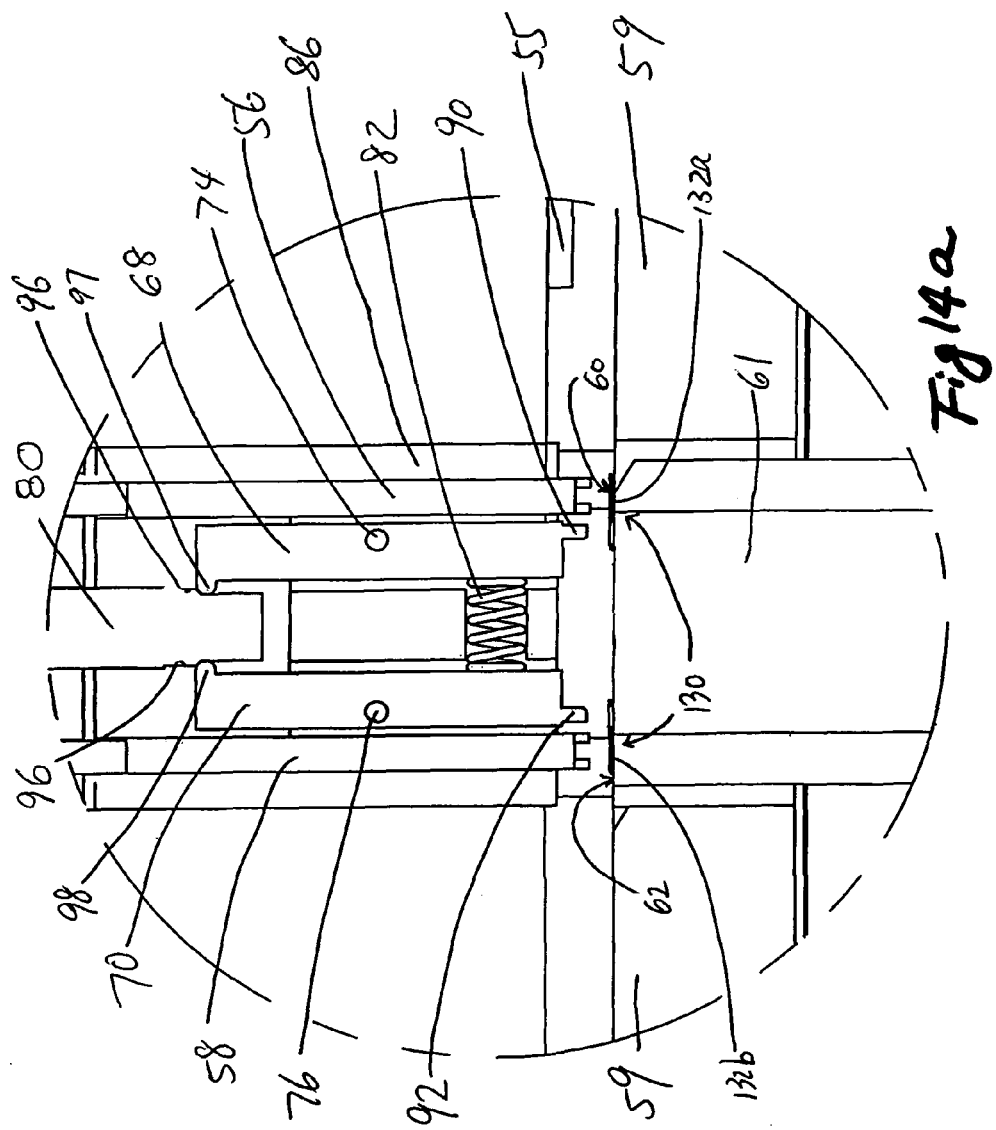
FIG. 14a is an enlarged detail view in cross section taken along line 14-14 of FIGS. 8b, 8c, 9c, and 9d, with a pair of clamps retracted and engaging members in first disengaged positions.

Referring to FIGS. 8c, 9c and 14a, after the semi-finished suspension product 130 is placed on the top surface 65 of the plate 59, the upper portion 47 of the apparatus 50 is advanced toward the lower portion 49 of the apparatus 50 along the direction 67. The upper portion 47 can be moved downwardly by a pneumatic press (not shown) or other power sources. Initially, the top surface 65 of the spring-loaded plate 59 is above the top surface 69 of the lower portion 49 and the support surfaces 60 and 62 (See FIG. 8b) of the support member 61. As the upper portion 47 moves downwardly, the spring-loaded pusher pins 55 contact the top surface 65 of the spring-loaded plate 59. Since springs (not shown) behind the pusher pins 55 have a greater spring force than that of springs (not shown) behind the plate 59, the pusher pins 55 drive the plate 59 downwardly until the top surface 65 of the plate 59, the support surfaces 60 and 62 (See FIG. 8b) of the support member 61, and the top surface 69 of the lower portion 49 become coplanar. The upper portion 47 then continues to move downwardly, except that the pusher pins 55 are stationary with respect to the lower portion 49. The springs (not shown) behind the pusher pins 55 are further compressed during this advance.

As the upper portion 47 moves downwardly, the spring-loaded locating pins 54 begin to insert into the locating holes 139 of the carrier strip 138 and the holes 51 in the lower portion 49 to locate the semi-finished suspension product 130 on the top surface 65 of the plate 59 and the support surfaces 60 and 62 of the support member 61. The upper portion 47 then continues to move downwardly, except that the pusher pins 55 and the locating pins 54 are stationary with respect to the lower portion 49. The springs (not shown) behind the locating pins 54 and the pusher pins 55 are compressed further during this further movement.

Referring particularly to FIG. 14a, at this position, the first and second clamps 56 and 58 are each located where the head suspension components 132b and 132a of the semi-finished suspension product 130 are not clamped. The first cam 80 is in a position where no pivoting forces are applied to the actuators 68 and 70. The actuators 68 and 70 with the engaging members 90 and 92 are in first disengaged positions. As used herein, the phrase "disengaged position" refers to a position of the actuator and the engaging member where the engaging member does not engage with any portion of the semi-finished suspension product.

Figure 14B:
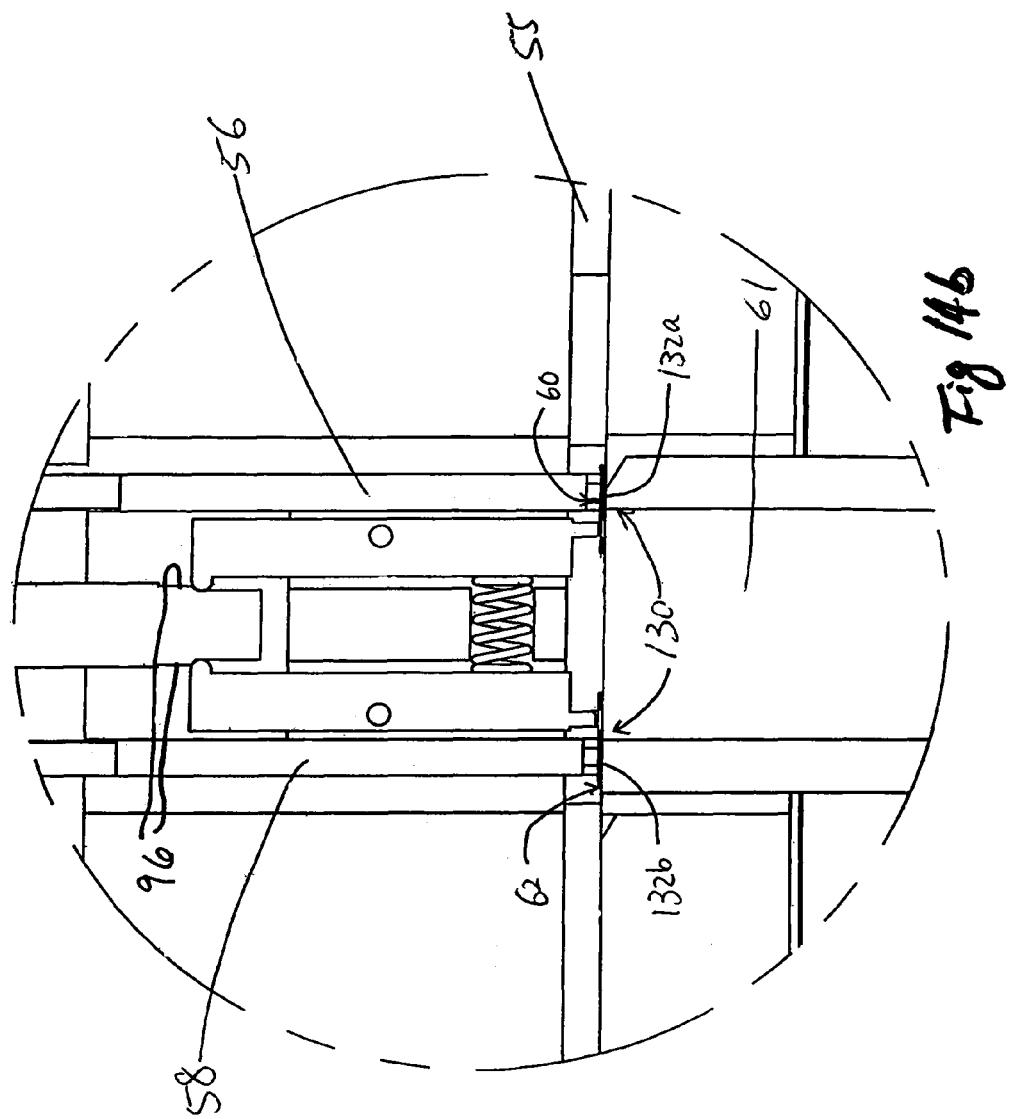
FIG. 14b is a view similar to FIG. 14a except that the clamps are advanced.
Figure 4C:
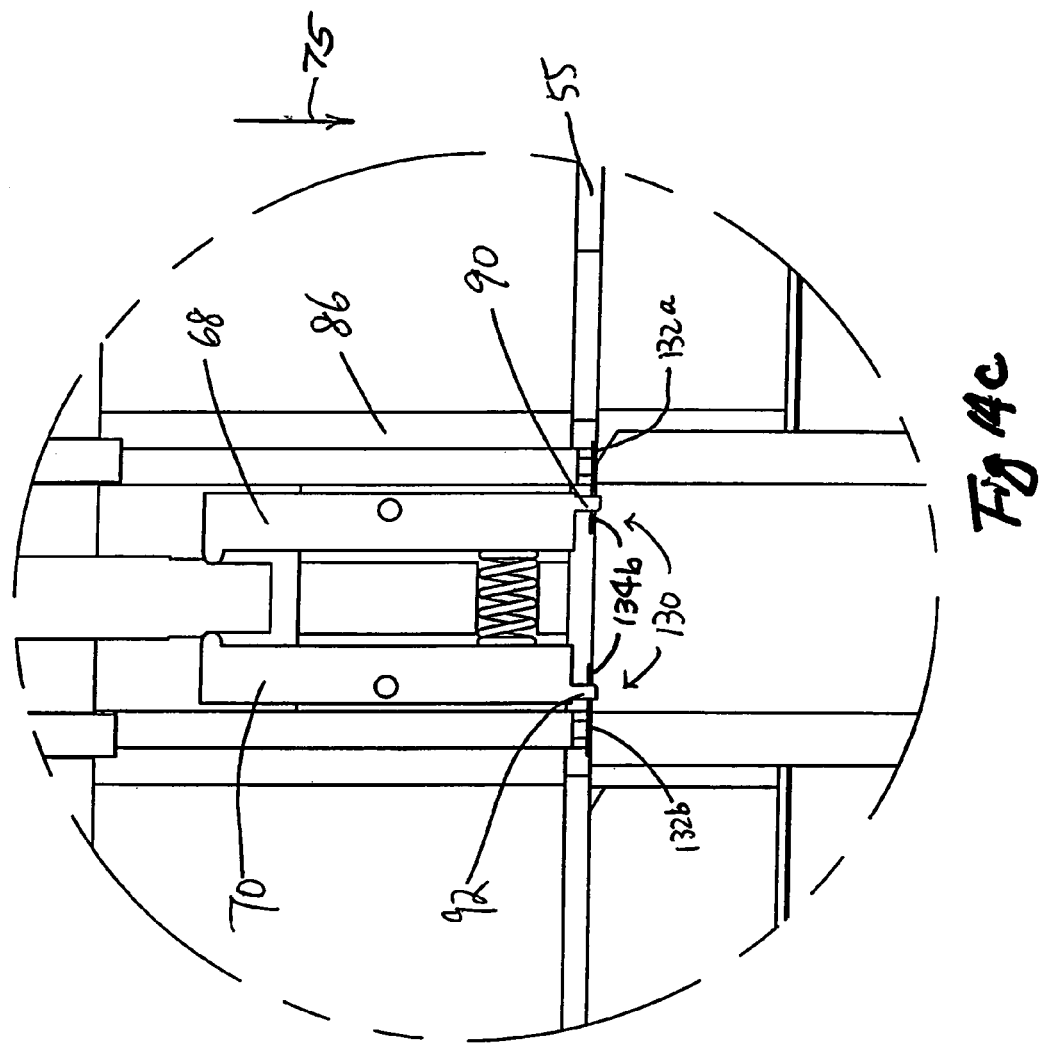

As the upper portion 47 moves downwardly, the spring-loaded clamps 56 and 58 respectively contact adjacent head suspension components 132b and 132a of the semi-finished suspension product 130 positioned on the support member 61. The upper portion 47 then continues to move downwardly, except that the pusher pins 55, the locating pins 54, and the clamps 56 and 58 are stationary with respect to the lower portion 49. The clamp springs 64 and 66, the springs (not shown) behind the pusher pins 55, and the springs (not shown) behind the locating pins 54 are compressed continuously. Referring to FIG. 14b, there shown are the clamps 56 and 58 clamping the first and second head suspension components 132b and 132a of the semi-finished suspension product 130 against the support surfaces 60 and 62 of the support member 61.

Referring now to FIGS. 8c, 9c, and 14c, as the upper portion 47 moves downwardly, the actuators 68 and 70 simultaneously move with the upper portion 47 and the hollow member 86, from the first disengaged position to the second disengaged position along a direction 75 that is generally perpendicular to the support surfaces 60 and 62 or a major surface of the semi-finished suspension product 130. In the second disengaged position, the engaging members 92 are positioned between the head suspension component 132b and the intermediate member 134b of the semi-finished suspension product 130, while the engaging members 90 are positioned between the head suspension component 132a and the intermediate member 134b. The engaging members 90 and 92 are not engaged with the semi-finished suspension product 130 in this position.

Figure 15A:
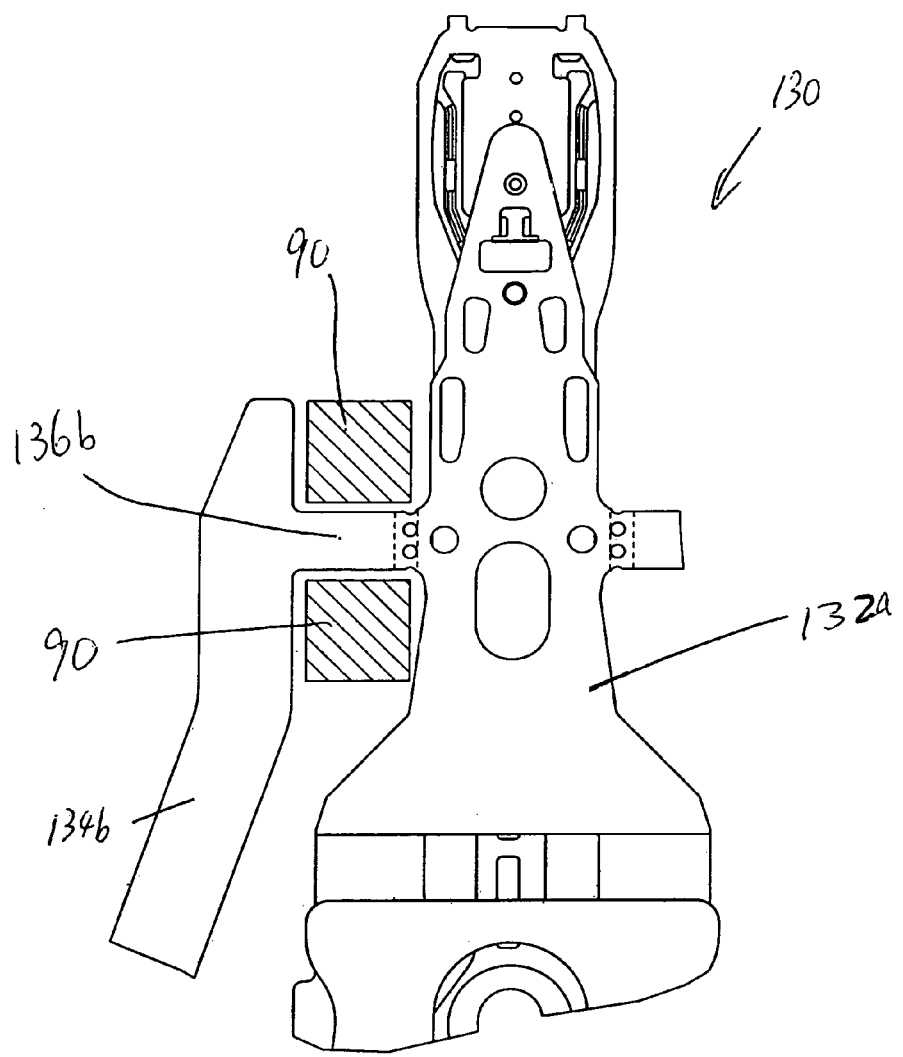
FIG. 15a is a fragmentary plan view of the semi-finished suspension product of FIG. 5a showing the engaging members positioned in the second disengaged position.

Referring now to FIG. 15a, there shown is a fragmentary top view of the semi-finished suspension product 130. The head suspension component 132a is located on the support surface 60 of the support member 61 as shown in FIG. 8c. The engaging members 90 are in the second disengaged position where the engaging members 90 do not engage with the semi-finished suspension product 130. This corresponds to the position of the parts shown in FIG. 14c. In the meantime, the hard stops 57 (See FIGS. 9b and 9d) of the hollow member 86 reach the top surface 65 of the plate 59 (See FIG. 8c). Since the hard stops 57 are fixedly attached to the bottom surface of the hollow member 86, the hollow member 86, and the actuators 68 and 70 are stationary with respect to the lower portion 49 as the upper portion 47 moves further downwardly. During this further motion, springs 89 (See FIG. 10) behind the hollow member 86 are compressed.

Figure 14D:
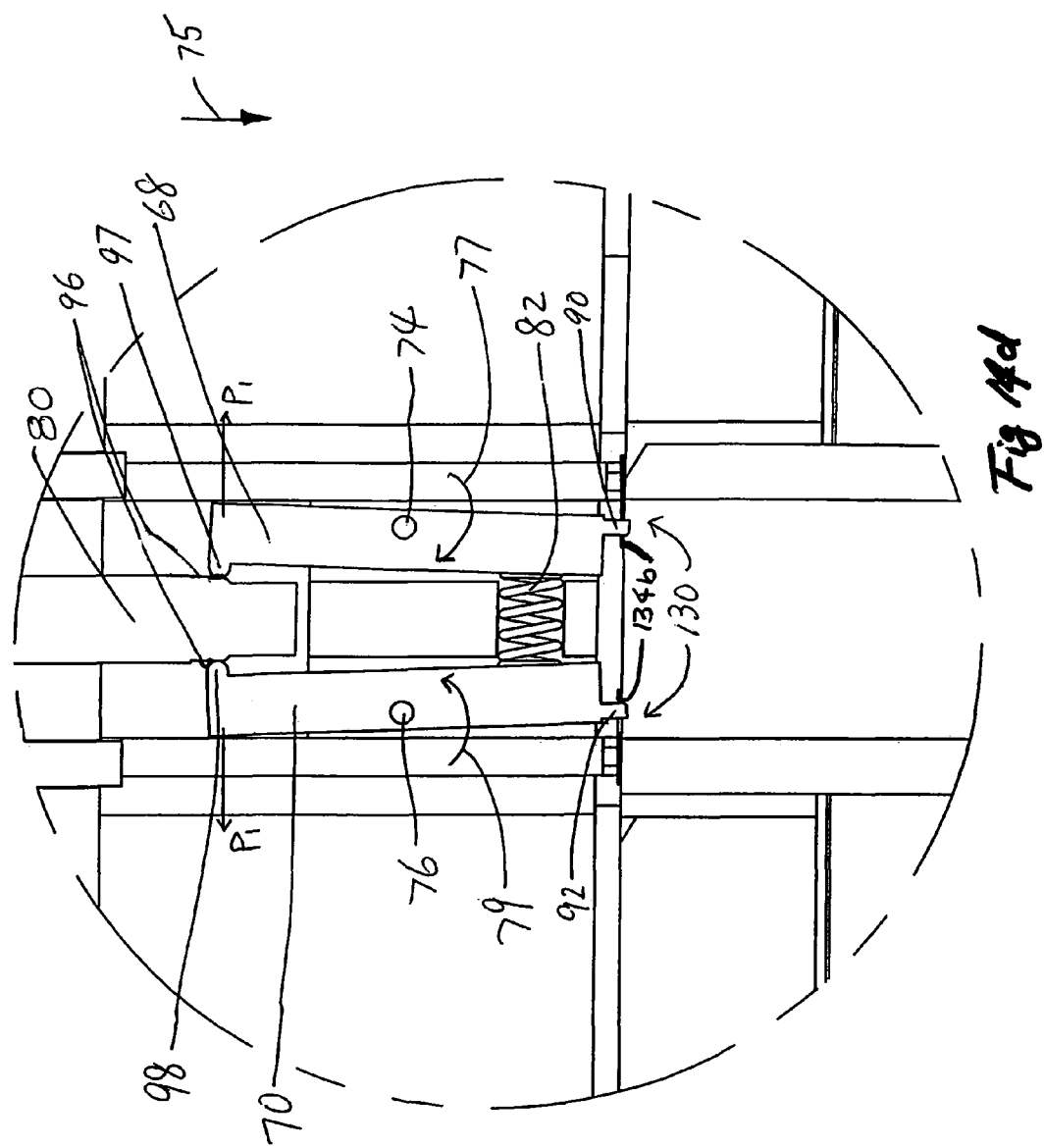
FIG. 14d is a view similar to FIG. 14c except that the engaging members are in engaged positions.

As described previously, the first and second cams 80 and 81 are secured to the body of the upper portion 47 of the apparatus 50, but not to the hollow member 86. Referring now to FIG. 14d, as the upper portion 47 moves downwardly, the first cam 80 moves with the upper portion 47 along the direction 75. The angled portion 96 of the first cam 80 then engages with the protruding portions 97 and 98 of the actuators 68 and 70 to apply a pivoting force $P_1$ to each of the actuators 68 and 70, so that the actuators 68 and 70 pivot about the rods 74 and 76 along directions 77 and 79, respectively, and compress the spring member 82.

When the actuator 68 pivots about the rod 74 along the direction 77, the engaging members 90 move from the second disengaged position to the engaged position. As used herein, the phrase "engaged position" refers to a position of the actuator and the engaging member where the engaging member engages with at least a portion of the semi-finished suspension product. Similarly, when the actuator 70 pivots about the rod 76 along the direction 79, the engaging members 92 move from the second disengaged position to the engaged position.

After the engaging members 90 and 92 reach the engaged positions, the first cam 80 continues to move downwardly with the upper portion 47 along the direction 75 to continuously apply the pivoting forces $P_1$ to the protruding portions 97 and 98. The actuators 68 and 70 then continue to pivot about the rods 74 and 76 along the directions 77 and 79, respectively, so that each of the engaging members 90 and 92 applies an engaging force to the intermediate member 134b of the semi-finished suspension product 130.

Figure 15B:
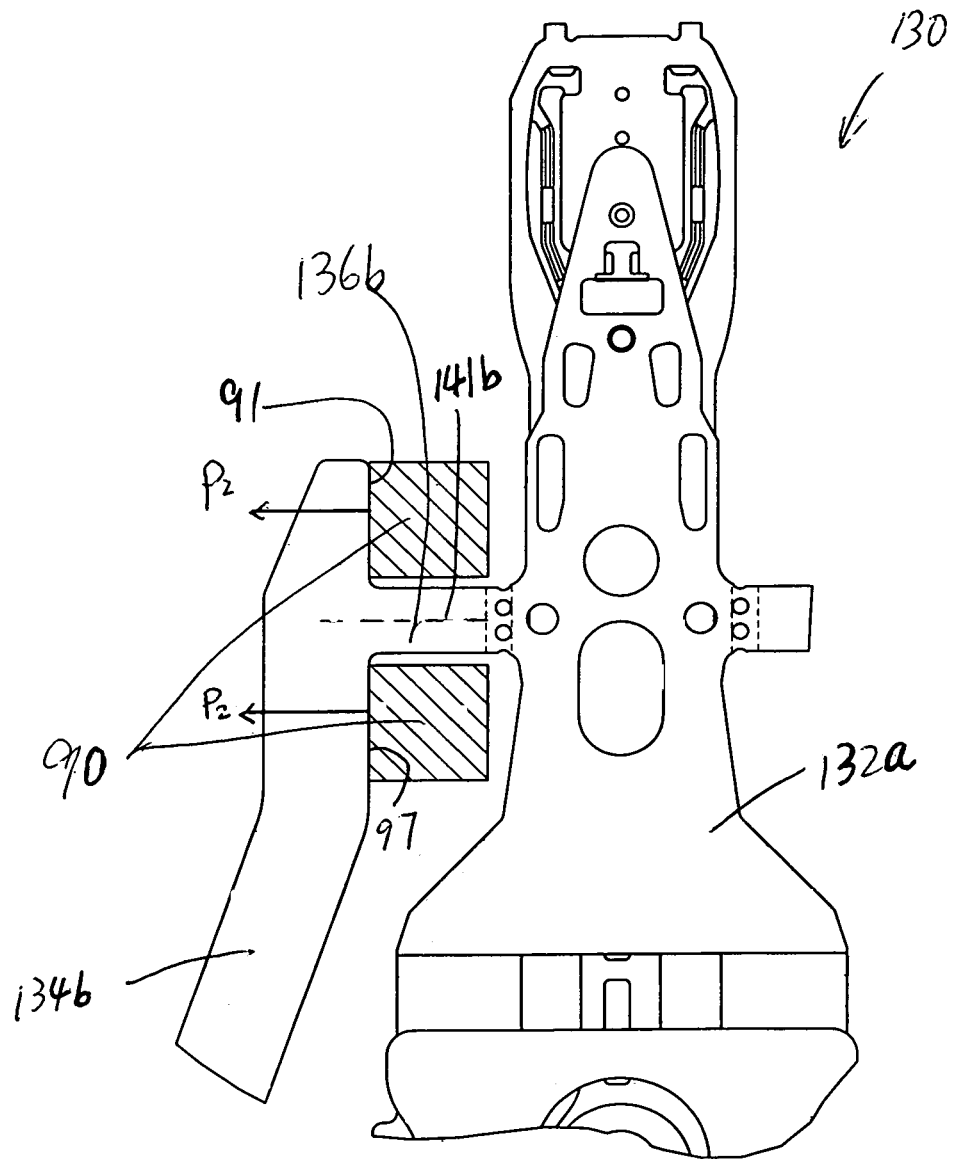
FIG. 15b is a view similar to FIG. 15a except that the engaging members are positioned in the engaged position.

Referring to FIG. 15b, there shown is a fragmentary top view of the semi-finished suspension product 130. Similar to FIG. 15a, the head suspension component 132a of the semi-finished suspension product 130 is located on the support surface 62 of the support member 61 as shown in FIG. 8c. The engaging members 90 are in the engaged positions where the engaging members 90 engage with the intermediate member 134b corresponding to the position of the parts shown in FIG. 14d. The engaging force $P_2$ is applied to the side regions 91 of the intermediate member 134b. As a result, a tensile load is applied to the tab 136b along an axis 141b, fracturing tab 136b. The head suspension component 132a is thus released from the intermediate member 134b.

Referring back to FIGS. 10-12, like the first and second actuators 68 and 70, the third actuator 72 includes a protruding portion 99. The angled portion 95 of the second cam 81 engages with the protruding portion 99 of the third actuator 72 to apply a pivoting force to the third actuator 72 as second the cam 81 moves downwardly with the upper portion 47 (See FIG. 9c). In the illustrated embodiment, the angled portion 95 of the second cam 81 engages with the protruding portion 99 of the third actuator 72 after the angled portions 96 of the first cam 80 engages with the protruding portions 97 and 98 of the first and second actuators 68 and 70. As a result, the third actuator 72 pivots about the third rod 78 after the first and second actuators 68 and 70 pivot about the first and second rods 74 and 76. Consequently, the third actuator 72 moves from its disengaged position to its engaged position after the first and second actuators 68 and 70 move from their disengaged position to their engaged position. A tensile load is then applied to the tab 140b (See FIG. 5) that connects the intermediate member 134b and the carrier strip 138 of the semi-finished suspension product 130 to cause the tab 140b to fracture. The intermediate member 134b is therefore released from the carrier strip 138 after the head suspension components 132a and 132b are released from the intermediate member 134b.

Thereafter, the pneumatic press (not shown) that is applied to the upper portion 47 of the apparatus 50 is reversed to open the apparatus 50. The clamp springs 64 and 66, the springs (not shown) behind the pusher pins 55, and the springs (not shown) behind the hollow member 86 begin to restore to their original states. The cams 80 and 81 are retracted, and the actuators 68, 70, and 72 pivot back from the engaged position to the second disengaged position. Next, the actuators 68, 70, and 72 are retracted to the first disengaged position. Next, the clamps 56 and 58 are retracted, releasing the head suspension components 132a and 132b.

The springs (not shown) behind the locating pins 54 also restore to their original state. As the carrier strip 138 of the semi-finished suspension product 130 is advanced in a stepwise manner, the detaching process discussed above will be repeated until all of the intermediate members are detached from the semi-finished suspension product 130. As stated previously, after tabs 136 and 140 are fractured, the head suspension components 132 are still attached to carrier strip 138 in the illustrated embodiment. Thereafter, the components 132 may be detached from the carrier strip 138 in a subsequent process.

Figure 16:
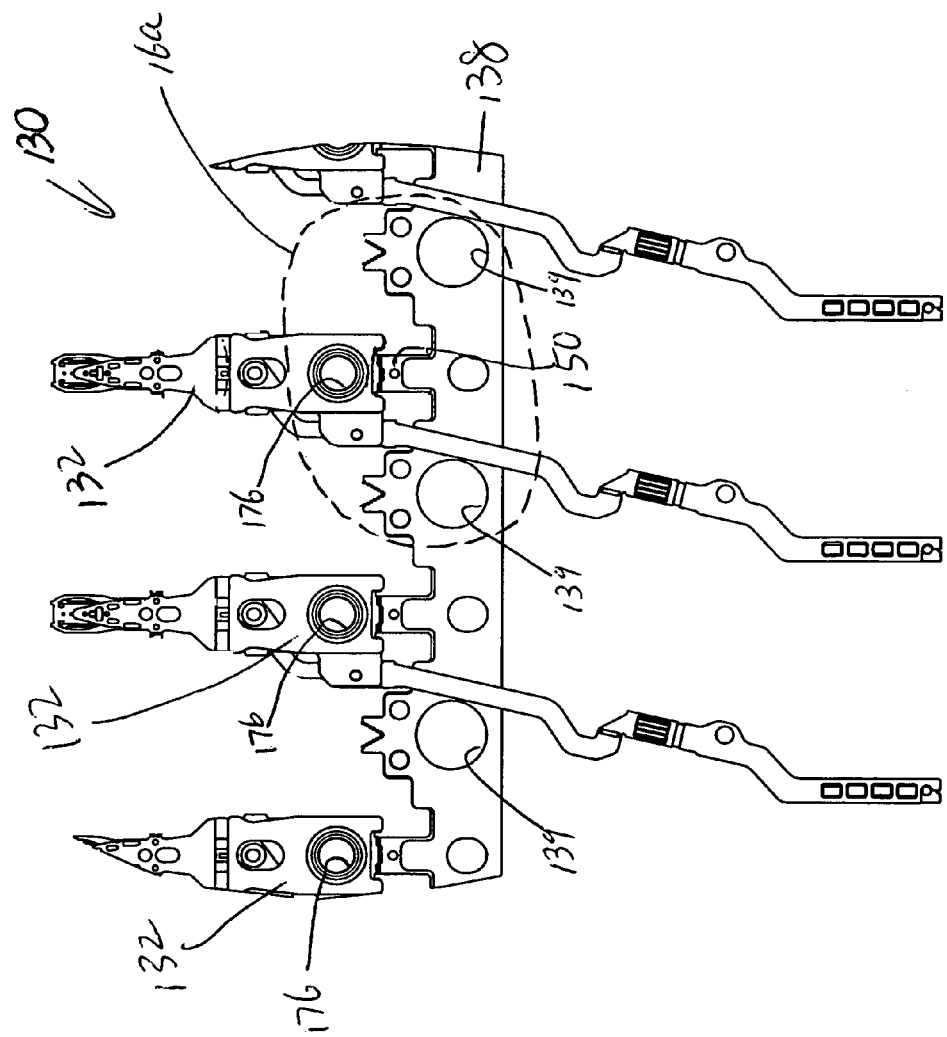
FIG. 16 is a plan view of the semi-finished suspension product of FIG. 5 where the intermediate members are detached.
Figure 16A:
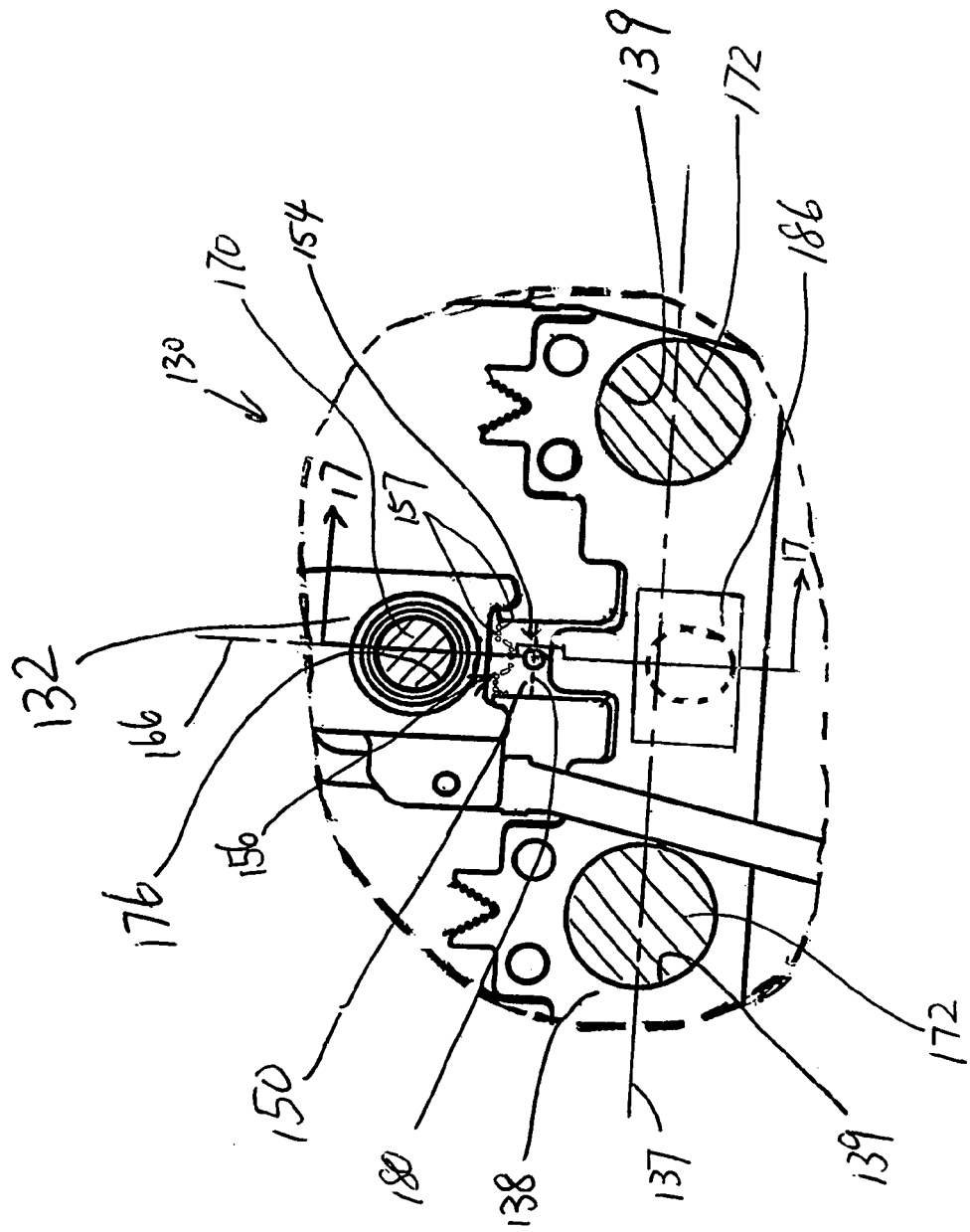
FIG. 16a is an enlarged plan view of a tab in the region 16a of FIG. 16 and showing a clamping member, a locating pin, and two transport pins of an apparatus in the section along line 16a-16a in FIG. 17b.
Figure 17A:
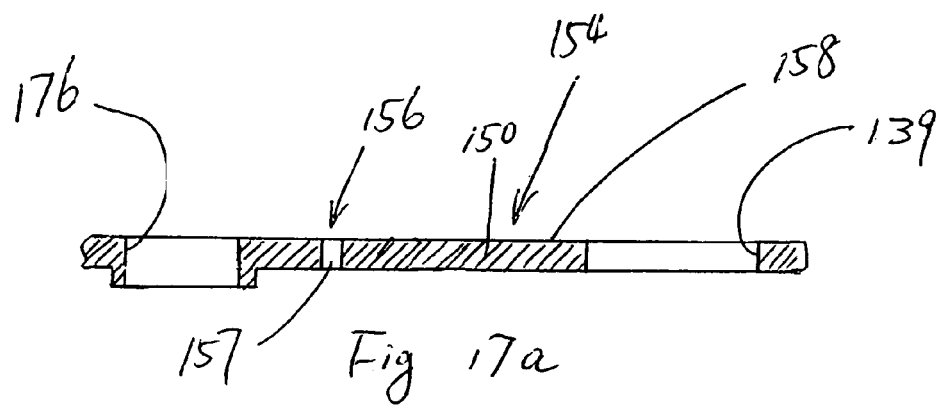
FIG. 17a is a cross-sectional view taken along line 17-17 of FIG. 16a with the clamping member and the locating pin omitted.

FIG. 16 is a plan view of the semi-finished suspension product 130 of FIG. 5 with the intermediate members detached. The head suspension components 132 are connected to the carrier strip 138 through tabs 150. Referring to FIGS. 16a and 17a, a detaching region 156 is included in the tab 150 in the same or a similar manner as described for the tabs 136 shown in FIG. 5a. In the illustrated embodiment, the detaching region 156 includes a plurality of apertures 157 extending therethrough. The tab 150 also includes a predetermined region 154 where a force is to be applied thereon. In the illustrated embodiment, the predetermined region is a line 180. The predetermined region 154 is located between the detaching region 156 and the carrier strip 138. The force that is applied to the predetermined region 154 is generally perpendicular to a major surface 158 of the semi-finished suspension product 130.

Figure 17B:
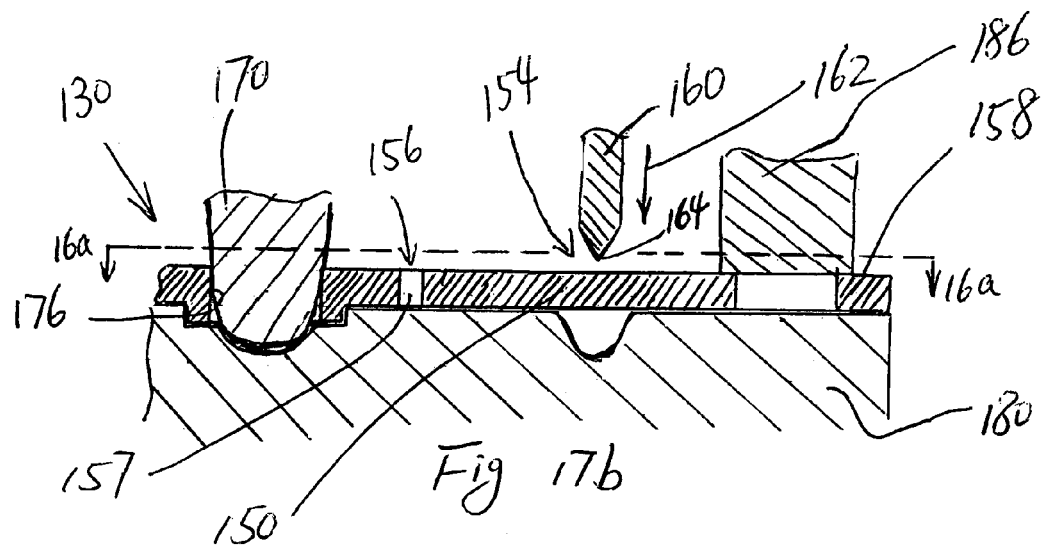
FIG. 17b is a cross-sectional view taken along line 17-17 of FIG. 16a with the clamping member and the locating pin. A punch of the apparatus is retracted.

Referring to FIGS. 16a and 17b, before applying the force to the predetermined region 154, the semi-finished suspension product 130 is held by an apparatus (not shown), which includes a first holding device, a second holding device, and a third holding device. In the illustrated embodiment, the first holding device includes locating pin 170, while the second holding device includes a clamping member 186. The third locating device includes one or more transport pins 172. The locating pin 170 and the transport pins 172 are similar to the locating pins 54 shown in FIG. 9c. The clamping member 186 is similar to the clamps 56 and 58 shown in FIGS. 9d, 11, and 13. The locating pin 170 is received in an aperture 176 to hold the head suspension component 132 in a first fixed location, while the clamping member 186 contacts the carrier ship 138 to hold the carrier strip 138 in a second fixed location for fracture of the tab 150. The transport pins 172 are received in at least a pair of apertures 139 straddling an axis 166 passing through aperture 176 to hold the carrier strip 138 in a third fixed location. The apparatus also includes a support block 180 for supporting the semi-finished suspension product 130 and for receiving the tip portions of the locating and transport pins 170 and 172.

The apparatus further includes a punch 160 capable of moving generally perpendicularly to a major surface 158 of the semi-finished suspension product 130. The punch 160 includes a shaped portion 164 aligned with the predetermined region 154 in the tab 150. In the illustrated embodiment, the shaped portion 164 has a ridged shape. The ridge-shaped portion is generally parallel to the major surface 158 and generally parallel to the axis 137 of the carrier strip 138 and generally perpendicular to the axis 166 of the tab 150. It is to be understood that the shaped portion 164 can have other shapes (e.g., convex, trapezoidal, etc.). In operation, the punch 160 is advanced toward the predetermined region 154 along a direction 162, which is generally perpendicular to the major surface 158.

Referring to FIG. 17c, as the punch 160 moves in the direction 162, it reaches the predetermined region 154 of the tab 150. A force $F_3$ is applied to the tab 150. As the punch 160 moves further along the direction 162, the material in the detaching region 156 of the tab 150 is moved towards its yield point, while a shaped groove 167 is formed in the predetermined region 154. In the illustrated embodiment, the shaped groove 167 has a "V" shape. The shaped portion 182 of the tab 150 is received in a concave portion 184 of the support block 180. A tensile load $F_4$ is generated in the tab 150. When the tensile load $F_4$ exceeds the ultimate strength of the detaching region 156, the tab 150 is fractured and the suspension component 132 is detached from the carrier strip 138 at the detaching region 156.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without, departing from the spirit or scope of the invention. Further, detaching a head suspension component from a semi-finished suspension product is to be understood to include completely and partially detaching a head suspension component from a semi-finished suspension product.

I claim:

1. A method for detaching a head suspension component from a semi-finished suspension product including at least one head suspension component and a locating and transport structure, the locating and transport structure including a carrier strip, the head suspension component integrally connected to the carrier strip by a tab positioned along an axis between the head suspension component and the carrier strip, the tab including a detaching region having a lower tensile strength than other regions of the tab, the method comprising the steps of:
   (a) holding the head suspension component in a first fixed location;
   (b) holding the carrier strip in a second fixed location; and
   (c) advancing a punch towards a predetermined region in the tab along a direction generally perpendicular to a major surface of the semi-finished suspension product, wherein the punch applies a force to the predetermined region, wherein the predetermined region in the tab is between the detaching region and the carrier strip, and wherein the force generates a tensile load along the axis sufficient to fracture the tab.

2. The method of claim 1 wherein step (a) includes advancing a locating pin in an aperture of the head suspension component.

3. The method of claim 1 wherein step (b) includes clamping the carrier strip.

4. The method of claim 1 further comprising holding the carrier strip in a third fixed location prior to step (c).

5. The method of claim 4 wherein holding the carrier strip in a third fixed location includes advancing a plurality of pins in respective apertures in the carrier strip.

6. A method for detaching a head suspension component from a semi-finished suspension product including at least one head suspension component and a locating and transport structure, the head suspension component integrally connected to the locating and transport structure by a tab positioned along a first axis between the head suspension component and the locating and transport structure, the tab including a detaching region having a lower tensile strength than other regions of the tab, the method comprising the steps of:
 (a) holding the head suspension component in a fixed location;
 (b) advancing an engaging member towards the locating and transport structure, including pivoting the actuator about a second axis generally perpendicular to the first axis; and
 (c) engaging the locating and transport structure along the first axis to apply a tensile load to the detaching region of the tab sufficient to cause the tab to fracture at the detaching region.

7. The method of claim 6 wherein step (a) includes clamping the head suspension component.

8. The method of claim 6 wherein the method further comprising moving an actuator having the engaging member attached thereto along a direction generally perpendicular a major surface of the semi-finished suspension product towards the semi-finished suspension product between steps (a) and step (b).

9. The method of claim 6 wherein engaging the locating and transport structure includes engaging the locating and transparent structure along the first axis at a location spaced from the detaching region.

10. A method of detaching a head suspension component from a semi-finished suspension product, the semi-finished suspension product including a locating and transport structure integrally connected to the head suspension component by a tab, the method comprising:
 (a) providing a detaching region in the tab and reducing a cross sectional area of the detaching region wherein reducing the cross sectional area of the detaching region includes reducing a thickness of the detaching region by partially etching the detaching region and wherein the detaching region has a lower tensile strength than other regions of the tab; and
 (b) applying a tensile load to the detaching region of the tab to cause the tab to fracture at the detaching region.

11. The method of claim 10 wherein the locating and transport structure includes a carrier strip.

12. The method of claim 10 wherein the locating and transport structure includes a carrier strip and at least one intermediate member integrally connected to the carrier strip, wherein the intermediate member is integrally connected to the head suspension components by the tab.

13. The method of claim 10 wherein the step of reducing a cross sectional area of the detaching region of the tab includes providing one or more apertures extending through the detaching region.

14. The method of claim 10 wherein the step of reducing a cross sectional area of the detaching region of the tab includes reducing a width of the detaching region.

15. The method of claim 14 wherein the step of reducing a width of the detaching region of the tab includes notching at least one edge of the detaching region.

16. The method of claim 10 wherein:
 the tab is positioned along an axis between the head suspension component and the locating and transport structure; and
 step (b) includes applying the tensile load along the axis.

17. The method of claim 16 wherein applying the tensile load along the axis includes:
 (i) holding the head suspension component in a fixed location; and
 (ii) applying a force to the tab along the axis of the tab away from the head suspension component.

18. The method of claim 16 wherein applying the tensile load along the axis includes:
 (i) holding the head suspension component in a first fixed location;
 (ii) holding the locating and transport structure in a second fixed location; and
 (iii) applying a force to a predetermined region in the tab, wherein the force is generally perpendicular to a major surface of the semi-finished suspension product, and wherein the predetermined region in the tab is between the detaching region and the locating and transport structure.

19. The method of claim 18 wherein step (iii) includes fracturing the tab at the detaching region when the tensile load exceeds an ultimate strength of the detaching region.

20. The method of claim 10 wherein applying a tensile load includes applying the tensile load to the detaching region of the tab from a location spaced from the detaching region.

21. A method of detaching a head suspension component from a semi-finished suspension product, the semi-finished suspension product including a locating and transport structure integrally connected to the head suspension component by a tab, the method comprising:
 (a) providing a detaching region in the tab and reducing a cross sectional area of the detaching region wherein reducing the cross sectional area of the detaching region includes reducing a thickness of the detaching region by coining the detaching region and wherein the detaching region has a lower tensile strength than other regions of the tab; and
 (b) applying a tensile load to the detaching region of the tab to cause the tab to fracture at the detaching region.

22. The method of claim 21 wherein the locating and transport structure includes a carrier strip.

23. The method of claim 21 wherein the locating and transport structure includes a carrier strip and at least one intermediate member integrally connected to the carrier strip, wherein the intermediate member is integrally connected to the head suspension components by the tab.

24. The method of claim 21 wherein the step of reducing a cross sectional area of the detaching region of the tab includes providing one or more apertures extending through the detaching region.

25. The method of claim 21 wherein the step of reducing a cross sectional area of the detaching region of the tab includes reducing a width of the detaching region.

26. The method of claim 25 wherein the step of reducing a width of the detaching region of the tab includes notching at least one edge of the detaching region.

27. The method of claim 21 wherein:
 the tab is positioned along an axis between the head suspension component and the locating and transport structure; and
 step (b) includes applying the tensile load along the axis.

28. The method of claim 27 wherein applying the tensile load along the axis includes:
   (i) holding the head suspension component in a fixed location; and
   (ii) applying a force to the tab along the axis of the tab away from the head suspension component.

29. The method of claim 27 wherein applying the tensile load along the axis includes:
   (i) holding the head suspension component in a first fixed location;
   (ii) holding the locating and transport structure in a second fixed location; and
   (iii) applying a force to a predetermined region in the tab, wherein the force is generally perpendicular to a major surface of the semi-finished suspension product, and wherein the predetermined region in the tab is between the detaching region and the locating and transport structure.

30. The method of claim 29 wherein step (iii) includes fracturing the tab at the detaching region when the tensile load exceeds an ultimate strength of the detaching region.

31. The method of claim 21 wherein applying a tensile load includes applying the tensile load to the detaching region of the tab from a location spaced from the detaching region.

* * * * *